US012762004B1

(12) United States Patent
Neumann et al.

(10) Patent No.: US 12,762,004 B1
(45) Date of Patent: Oct. 13, 2026

(54) ROOT CAUSE ANALYSIS FOR COMPUTER PROGRAMS

(71) Applicant: AUGMENT COMPUTING, INC., Palo Alto, CA (US)

(72) Inventors: Lior Neumann, Tel Aviv (IL); Colin Flaherty, New York, NY (US)

(73) Assignee: AUGMENT COMPUTING, INC., Palo Alto, CA (US)

( * ) Notice: Subject to any disclaimer, the term of this patent is extended or adjusted under 35 U.S.C. 154(b) by 0 days.

(21) Appl. No.: 18/962,679

(22) Filed: Nov. 27, 2024

(51) Int. Cl.

| | |
|---|---|
| ***G06F 11/00*** | (2006.01) |
| ***G06F 11/07*** | (2006.01) |
| ***G06F 11/32*** | (2006.01) |
| ***G06F 11/3668*** | (2025.01) |

(52) U.S. Cl.
CPC .......... *G06F 11/079* (2013.01); *G06F 11/327* (2013.01); *G06F 11/3684* (2013.01)

(58) Field of Classification Search
CPC .. G06F 11/079; G06F 11/327; G06F 11/3676; G06F 11/368; G06F 11/3684; G06F 11/3692; G06F 11/3688
See application file for complete search history.

(56) References Cited

U.S. PATENT DOCUMENTS

| | | | | |
|---|---|---|---|---|
| 12,585,543 | B2 * | 3/2026 | Fox | G06F 11/1433 |
| 2018/0307593 | A1 * | 10/2018 | Assulin | G06F 11/3692 |
| 2020/0201741 | A1 * | 6/2020 | Saha | G06F 8/30 |
| 2021/0263728 | A1 * | 8/2021 | Farrier | G06F 17/18 |
| 2023/0021373 | A1 * | 1/2023 | Kabbinale | G06F 18/24 |
| 2023/0055527 | A1 * | 2/2023 | Majithia | G06F 11/079 |
| 2024/0311922 | A1 * | 9/2024 | Fields | G09B 5/06 |
| 2025/0044991 | A1 * | 2/2025 | Darji | G06F 3/0619 |
| 2025/0061047 | A1 * | 2/2025 | Sun | G06F 11/3692 |

* cited by examiner

*Primary Examiner* — Marc Duncan

(57) ABSTRACT

Methods, systems, products, services, and apparatuses for root cause analysis for computer programs, including: receiving an indication to identify a root cause of a failed test of a computer program; and identifying, by a root cause model, from a plurality of changes to the computer program, based on data describing the failed test, one or more changes to the computer program as the root cause of the failed test.

20 Claims, 10 Drawing Sheets

ROOT CAUSE ANALYSIS FOR COMPUTER PROGRAMS

DETAILED DESCRIPTION

The present disclosure relates to methods, products, apparatuses, and services for root cause analysis for computer programs, that may be achieved at least in part using generative AI. Generative AI is a category of artificial intelligence that focuses on creating and generating new data, content, or information. Systems, software, and services that leverage generative AI (hereafter referred to as 'generative AI systems') may be able to produce outputs that resemble human-generated content, such as text, audio, and more, often enabled through the usage of deep learning techniques and neural networks. In one particular embodiment, generative AI systems may be able to produce computer program code (also referred to hereafter simply as 'code') in a variety of programming languages, as pseudocode, or in some other way.

Figure 1:
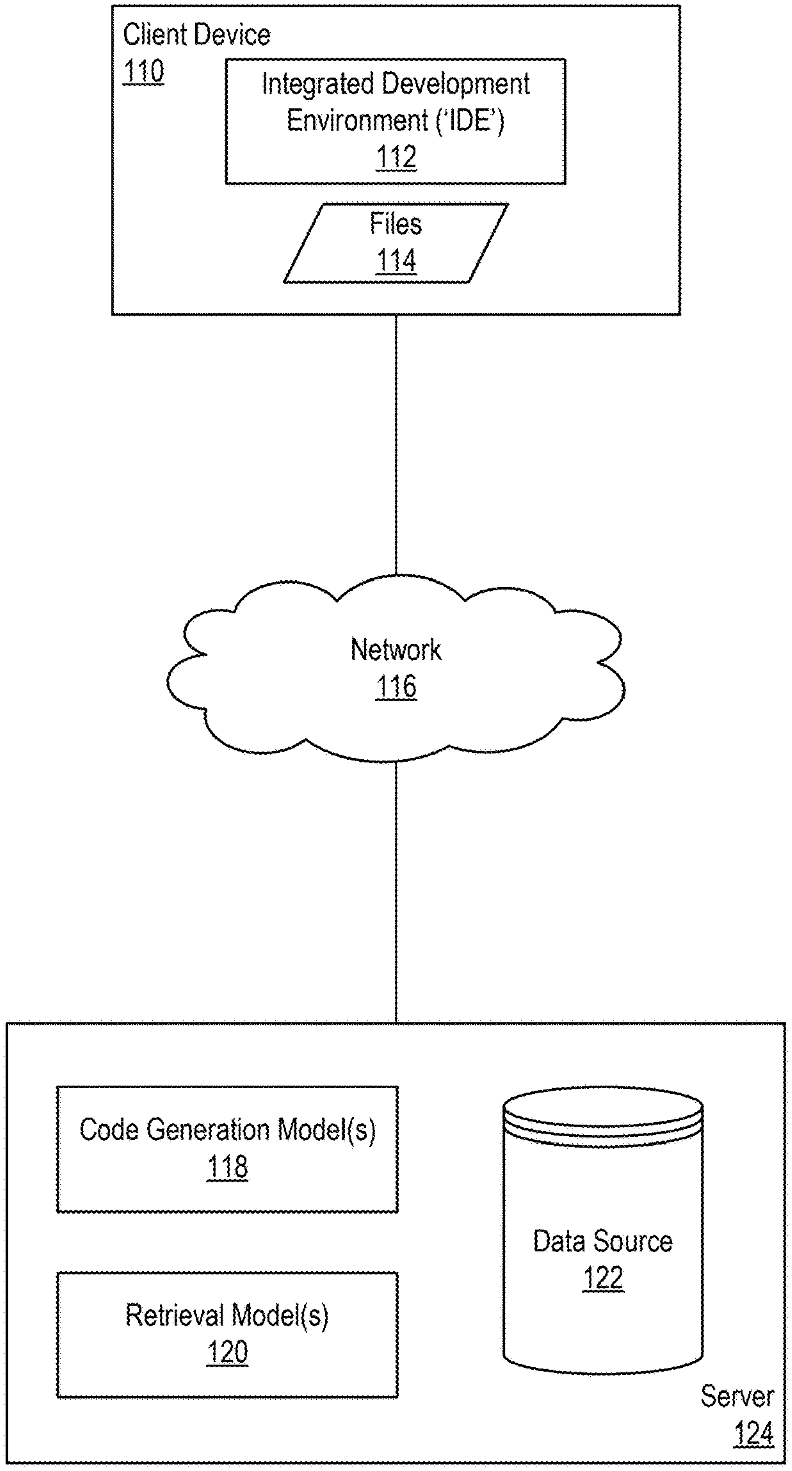
FIG. 1 a block diagram of an example system for enterprise specific code generation using generative artificial intelligence ('AI') in accordance with some embodiments of the present disclosure.

FIG. 1 is a block diagram of an example system in which one or more models are leveraged for enterprise specific code generation using generative AI. FIG. 1 includes a client device 110 and a server 124 that are connected via a network 116. The network 116 depicted in FIG. 1 may be embodied, for example, as a system (including a collection of networking devices, data communications links, and so on) that enables the exchange of digital information between multiple devices (e.g., endpoints), where in this embodiment those devices or endpoints include the client device 110 and the server 124. The network 116 may leverage physical or wireless medium to carry data between nodes using one or more data communications protocols. Such data communications protocols may include the rules and conventions that govern how data is formatted, transmitted, and received within the network 116. Such protocols can include, for example, TCP/IP, HTTP, SMTP, cellular protocols, and many others. Such a network 116 may be embodied as, for example, a Local Area Network ('LAN') that covers a small geographical area, a Wide Area Network ('WAN') that spans larger regions, a Virtual Private Network ('VPN') that uses encryption to create secure and private communication channels, the internet, or in some other way.

The client device 110 depicted in FIG. 1 may be embodied, for example, as a computer, smartphone, tablet, or other computing device that accesses and utilizes services provided by the server 124. The client device 110 will be described in greater detail herein, but the client device 110 may also include one or more applications or user interfaces that allows users of the client device 110 to interact with the server 124, one or more modules of software and hardware that enable the client device 110 to communicate with the server 124 by sending messages, packets, and the like to the server 124, various hardware components such as computer processors, memory, storage, networking interfaces, and much more. The client device 110 may also include one or more displays (e.g., a connected monitor, a touchscreen) and one or more user input devices (e.g., a keyboard, a mouse, a touchscreen) that enable users of the client device 110 to interact with the client device 110.

In the example depicted in FIG. 1, the client device 110 includes an integrated development environment ('IDE') 112. The IDE 112 may be embodied, for example, as a software application that provides an integrated set of tools and features to streamline the software development process. IDEs 112 may be used by developers to write, test, and debug code more efficiently, and may include features to support software development tasks such as coding, debugging, and project management. Examples of IDEs 112 that may be supported by the client device 110 can include, for example, Visual Studio, IntelliJ IDEA, Eclipse, NetBeans, PyCharm, and many others. The particular IDE 112 that is leveraged may depend on the programming language and platform being used.

In the example depicted in FIG. 1, the IDE 112 can include (amongst other modules and features) a code editor, which may be embodied as an interface that is used by a software developer to write, edit, and view source code. The editor may include features like syntax highlighting, code formatting to enhance code readability, and code completion features that may be augmented by interactions with the server 124 as described in greater detail herein.

In the example depicted in FIG. 1, the IDE 112 (or some other tool) may be used to access and/or manage one or more files 114. The one or more files 114 can include, for example, source code files that contain the instructions and logic for the software being developed (written in Java, Python, C++, or some other programming language), header files or other library files, configuration files which may specify settings and parameters for the application being developed, template files, script files, documentation files, configuration files for the IDE 112, and many others.

The server 124 depicted in FIG. 1 may be embodied, for example, as one or more computers (although in other embodiments the server 124 may be embodied as one or more hosted application(s)) that provides services, resources, or data to one or more client devices 110 over a network 116. The server 124 may include dedicated hardware systems designed to handle heavy workloads and ensure reliability, although in other embodiments the server 124 may be implemented through software on standard computers. Specialized server operating systems and software may even be used to optimize performance, security, or for some other purpose.

The server 124 depicted in FIG. 1 includes one or more code generation model(s) 118. The code generation model(s) 118 depicted in FIG. 1 may be embodied, for example, as one or more machine learning models designed to generate executable source code for various programming tasks. The code generation model(s) 118 may utilize natural language processing and machine learning techniques to understand and generate code in programming languages like Python, JavaScript, Java, C-based languages, and others. The code generation model(s) 118 may leverage deep learning architectures, such as recurrent neural networks (RNNs), transformers, or hybrid models that combine convolutional and recurrent layers.

In the examples depicted in FIG. 1, the code generation model(s) 118 may be configured to generate enterprise specific code. In other embodiments, the generated code may not be 'enterprise' specific but may be specific to some other group of users, some other entity that has associated computer code, or any other entity. In some embodiments, the code generation model(s) 118 generate enterprise (or entity) specific code, for example, in the sense that the code generation model(s) 118 are trained on code for a particular enterprise (e.g., a particular business organization, a particular business unit within a particular business organization) or entity, in the sense that code generation model(s) 118 leverage a knowledge base that is specific to some particular enterprise or entity (e.g., the enterprise's code base), or in some other way. As such, the code generation model(s) 118 depicted here may produce output that is tailored for a specific enterprise or entity as it adheres to their standards, leverages their code base, is written in their same style, and so on.

The code generation model(s) 118 depicted in FIG. 1 may be configured to consider the context in which the code is generated, as the code generation model(s) 118 can take into account any surrounding code or variables that may influence the code generation process. The code generation model(s) 118 may be used for code completion tasks where the code generation model(s) 118 are used to assist developers by providing code completion suggestions as the developer writes code. That is, the code generation model(s) 118 may (via the IDE 112) be provided with information describing where a user's cursor is positioned within a code editor, what code precedes the cursor, what code follows the cursor, and so on, as inputs to code completion process.

In the example depicted in FIG. 1, the server 124 can also include one or more retrieval model(s) 120. The retrieval model(s) 120 depicted in FIG. 1 may be embodied, for example, as machine learning models used for generating responses or recommendations based on retrieving and selecting relevant pre-existing content from a database or knowledge base (depicted herein as data source 122). The retrieval model(s) 120 may therefore leverage existing data or content to provide responses that are contextually appropriate and accurate. Such retrieval model(s) 120 may therefore rely on a database or knowledge base that contains a pre-existing data that serves as a source of information for generating responses. In FIG. 1, the retrieval model(s) 120 rely on information in the depicted data source 122, where the data source 122 can include, for example, a code repository associated with a particular enterprise or entity, documentation associated with the code base, and other information that is relevant to code that has been developed by the particular enterprise or entity.

In the example depicted in FIG. 1, the retrieval model(s) 120 may leverage various techniques such as, for example, feature extraction to identify meaningful features from content in the enterprise's code repository and code in the code editor of the IDE 112, similarity scoring or similar techniques to measure similarity between code in the code editor of the IDE 112 and the content in the data source 122, content ranking and selection, and so on. Such retrieval model(s) 120 may, in some embodiments, be combined with generative models (e.g., the code generation model(s) 120) to create hybrid models that leverages the strengths of both retrieval and generative models to produce more contextually relevant code completion recommendations.

In some embodiments, the retrieval model(s) 120 may be configured to generate precomputed latent representations of stored code (e.g., the code in a particular code base). The latent representation may be embodied, for example, as a floating-point value that captures relevant information about the stored code. Such features may not be directly observed or defined, but instead may be learned by the retrieval model(s) 120 from the raw input data (in this case the stored code). Such latent representations may be made available to the code generation model(s) 118 instead of (or in addition to) the textual representation of the stored code. In such a way, the latent representation may be further processed to encode additional context, deeper understanding, and interconnection with other memories. Furthermore, the systems described herein may refine the latent representations asynchronously and offline (i.e., separately from the process of the code generation model(s) 118 generating code).

In some embodiments, the retrieval model(s) 120 can be enhanced using static analysis of code. Such a process may, in some embodiments, involve statically analyzing existing code (i.e., code from a user's code base) to pick out some fill-in-the-middle ('FIM') examples. For example, the retrieval model(s) 120 may be trained with examples of what is typically written between a set of parentheses, examples of what is typically written inside a loop, examples of what is typically written to complete a function, and so on.

In some embodiments, the generative AI systems described here may leverage a set of static code analysis heuristics that work well and can be used to create a dataset that is useful for training models used by generative AI systems that can do FIM for computer program code. In these embodiments, models are trained, and training sets are generated to cover sampling at multiple levels of hierarchy (parenthesis, functions, class, etc. . . . ). The training sets are also created with a distribution that is similar to a distribution that would be similar to a user's knowledge base (i.e., their code repository) so that models behave in accordance with the appropriate distribution.

Readers will appreciate that because each client device 110 has its own set of files 114, a software developer using a first client device may have a different set of files than a client software developer using a second client device. For example, the software developer using a first client device may update some function in a particular file, but without actually committing the updated file to a shared codebase (which may involve rounds of review or other version control procedures), the software developer using a second client device may not have access to the updated function in the particular file. As such, it is not abnormal for users of different client devices to have different versions of a shared codebase.

Readers will further appreciate that because each client device 110 can upload its local files to the server 124, the server 124 may generate different code completion recommendations for a user on a first client device 110 that has a first version of a particular file 114 than it would generate for a user on a second client device 110 that has a second version of a particular files 114, given that the different versions of the particular file 114 could result in different input tokens being sent to the code generation model(s) 118 and/or the retrieval model(s) 120. Readers will appreciate that although some files 114 may be distinct between a first client device and a second client device, some other files 114 may be identical (especially for two developers that are working on the same codebase). As such, and to avoid costly duplication, files (or portions thereof) may be deduplicated so that files (or portions thereof) that are common across multiple client devices 110 are only stored once by the server 124.

Figure 2:
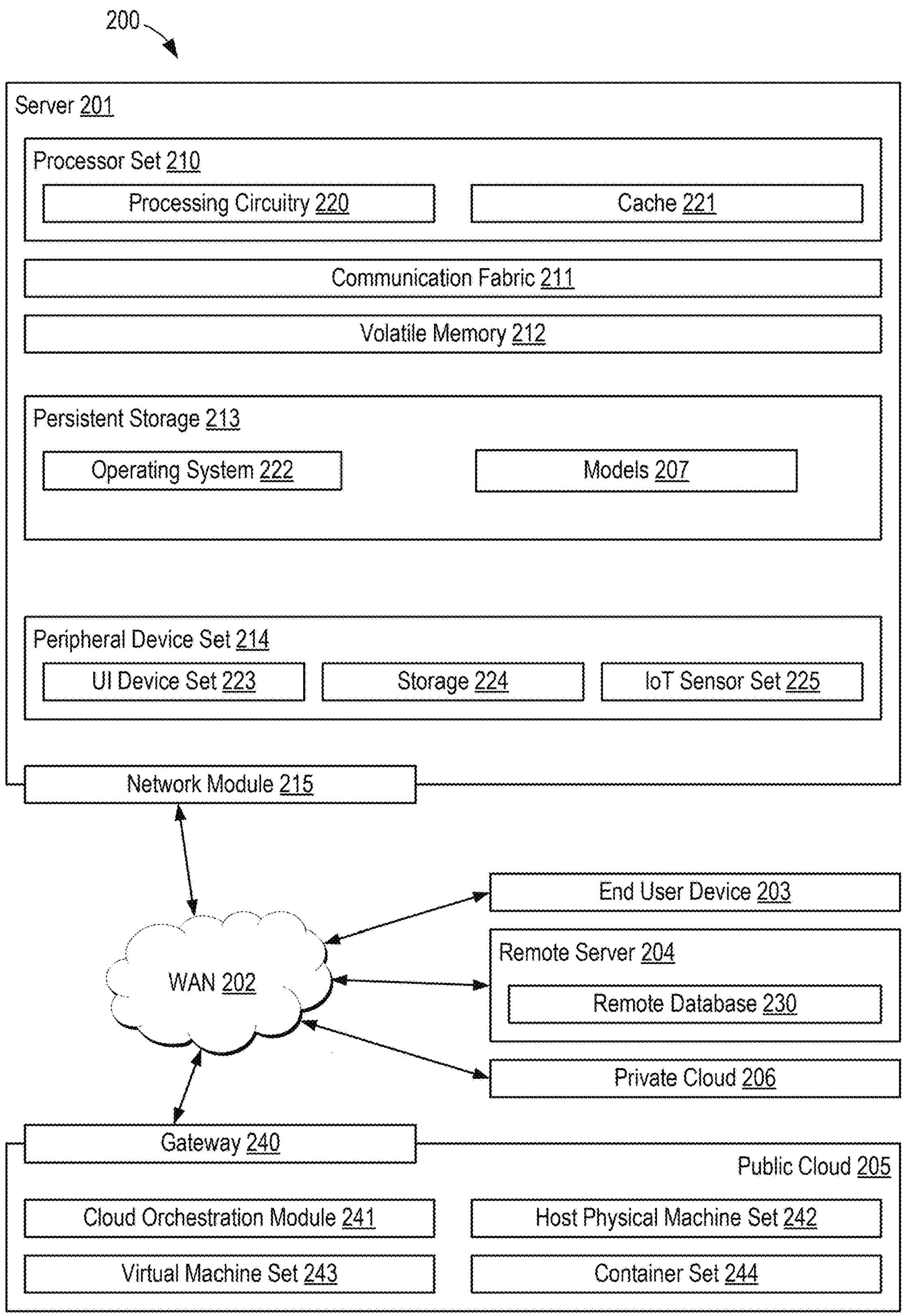
FIG. 2 sets forth a block diagram of an example computing environment configured for enterprise specific code generation using generative AI in accordance with some embodiments of the present disclosure.

For further explanation, FIG. 2 sets forth a block diagram of an example computing environment 200 configured for enterprise specific code generation using generative AI in accordance with some embodiments of the present disclosure. Computing environment 200 contains an example of an environment for the execution of at least some of the computer code involved in performing the inventive methods, such as various models 207 that may correspond to the models described in FIG. 1 and elsewhere in the present disclosure. In addition to models 207, computing environment 200 includes, for example, computer 201, wide area network ('WAN') 202, end user device ('EUD') 203 that may be similar to the client device of FIG. 1, remote server 204, public cloud 205, and private cloud 206. In this example embodiment, computer 201 includes processor set 210 (including processing circuitry 220 and cache 221), communication fabric 211, volatile memory 212, persistent storage 213 (including operating system 222 and models 207), peripheral device set 214 (including user interface ('UI') device set 223, storage 224, and Internet of Things ('IoT') sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in models 207 in persistent storage 213.

Communication fabric 211 is the signal conduction path that allows the various components of computer 201 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid-state storage devices. Operating system 222 may take several forms, such as various known proprietary operating systems or open-source Portable Operating System Interface-type operating systems that employ a kernel. The models 207 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network ('SAN') that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215. Network module 215 may be configured to communicate with other systems or devices.

WAN 202 is any wide area network (for example, the internet) capable of communicating computer data over non-local distances by any technology for communicating computer data, now known or to be developed in the future. In some embodiments, the WAN 202 may be replaced and/or supplemented by local area networks ('LANs') designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device ('EUD') 203 is any computer system that is used and controlled by an end user (for example, a customer of an enterprise that operates computer 201), and may take any of the forms discussed above in connection with computer 201. In some embodiments, the EUD 203 may perform all of the functions of the client device of FIG. 1 and may include the IDE and other components described with reference to FIG. 1 and elsewhere in the present disclosure. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments ('VCEs') typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments ('VCEs') will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

Figure 3:
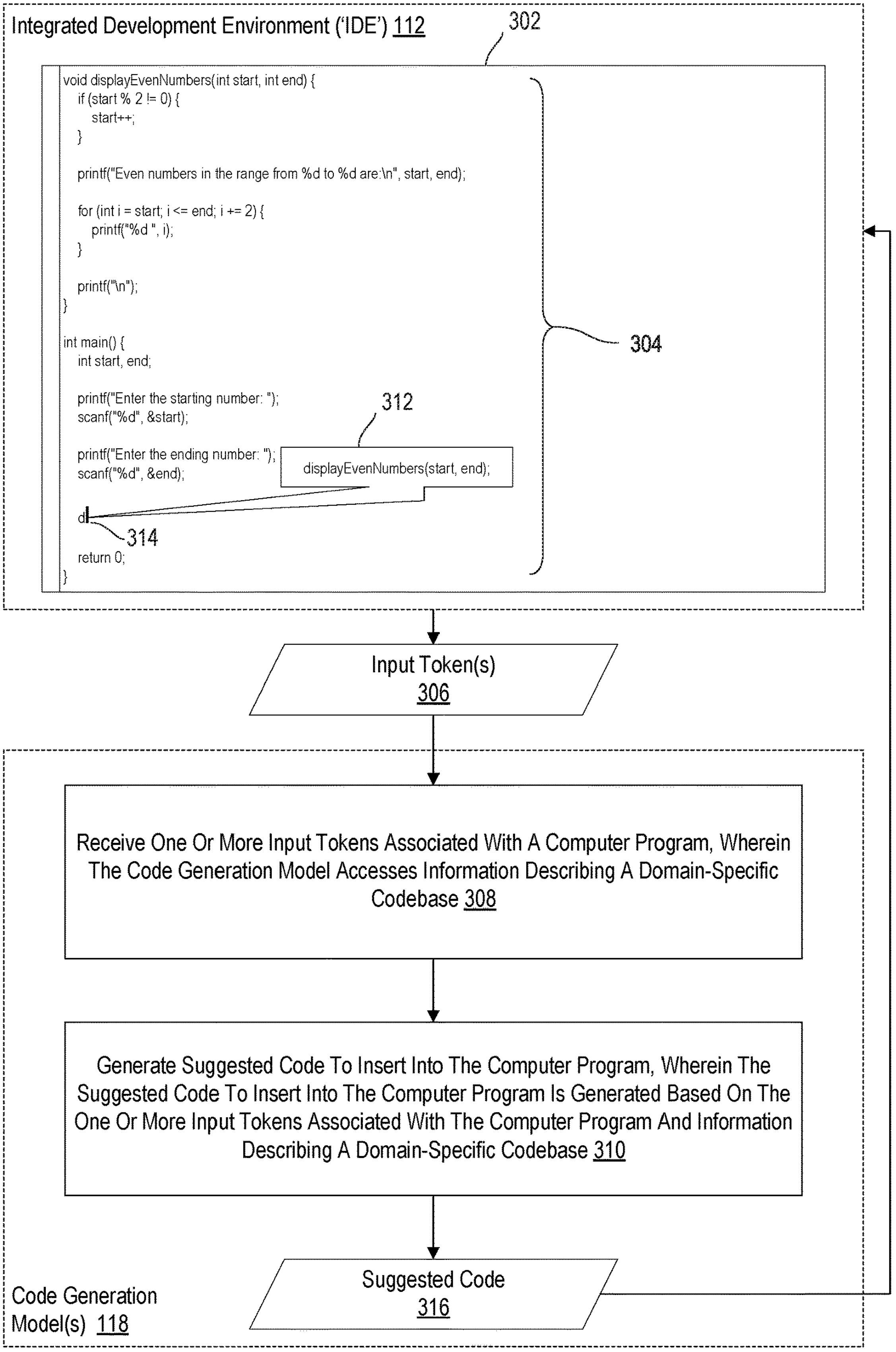
FIG. 3 sets forth a flow chart illustrating an example method of enterprise specific code generation using generative AI in accordance with some embodiments of the present disclosure.

For further explanation, FIG. 3 sets forth a flow chart illustrating an example method of enterprise specific code generation using generative AI in accordance with some embodiments of the present disclosure. The example method depicted in FIG. 3 includes one or more code generation model(s) 118 and an IDE 112 as described elsewhere in the present disclosure.

In the example depicted in FIG. 3, the IDE 112 includes a code editor 302, where a computer program 304 that displays even numbers between two input parameters. In this example, the computer program 304 is intended to be depicted as being in draft, with a software developer drafting code that is included in the computer program 304. More specifically, the software developer's cursor 314 is depicted near the bottom of the computer program 304, as the developer is writing a line of code that begins with the letter "d" followed by the cursor 314. In this example, the code editor 302 is depicted as displaying a recommended code completion 312 that is generated as will be described in greater detail below. The recommended code completion 312 includes a function call to the displayEventNumbers function that is defined in the code editor 302. Readers will appreciate that this example is purposefully intended to be quite simple for ease of explanation, but in other embodiments the recommended code completion 312 may be far more complex, may be presented in other ways, and so on. In fact, although this embodiment illustrates an example in which recommended code completions 312 are presented to a software developer via an IDE 112, in other embodiments the systems, methods, products, modules, or components described herein may be used to automatically generate entire software applications, functions, and so on.

The example method depicted in FIG. 3 includes receiving 308, by a code generation model 118, one or more input tokens 306 associated with a computer program 304. The one or more input tokens 306 may be discrete units of information (e.g., text, some representation of text such as a hash of the text) that are used to as input to the code generation model(s) 118. For example, a first token may include some representation of the text that precedes the location of the cursor 314 in the computer program 304, a second token may include some representation of text that follows the location of the cursor 314, and so on. In fact, many tokens may be generated that represent different portions of the text that precedes the location of the cursor 314, different portions of the text that follows the location of the cursor 314, representations of portions of documentation associated with the computer program 304, representations of libraries that are utilized by the computer program 304, representations infrastructure-as-code ('IaC') templates for the environment that executes the computer program 304, and so on. In such a way, the tokens can essentially represent the state of the computer program 304 that is being developed.

Readers will appreciate that the input tokens 306 can essentially guide the behavior of the code generation model (s) 118 and can be important inputs that drive the output of the code generation model(s) 118. Each input token 306 may be part of a sequence of input tokens 306 that collectively form the input to the code generation model(s) 118. Readers will appreciate that input tokens 306 can be of differing types that may determine how the code generation model(s) 118 interprets and processes each particular input token 306. Readers will further appreciate that the position of each input token 306 in the input sequence signifies the order or context in which the input token 306 appears, as the preceding and following input tokens 306 in the input sequence provides context for a particular input token 306. In such a way, the context helps the code generation model(s) 118 understand the relationships and dependencies between various input tokens 306, thereby helping the code generation model(s) 118 generate accurate and contextually relevant suggested code 316 that can ultimately be presented as a recommended code completion 312 or leveraged in some other way. The input tokens 306 may be generated by the IDE 112 or some other module performing a variety of steps, including preprocessing steps to clean and structure the code data. This process may involve performing tokenization steps, separating code into individual tokens (e.g., keywords, operators, identifiers), removing irrelevant or sensitive information, and performing other preprocessing steps to generate the input tokens 306.

In the example method depicted in FIG. 3, the one or more input tokens 306 associated with the computer program 304 may be generated by the IDE 112, by a plug-in or extension for the IDE 112, by some other module that is accessible by the IDE 112, or by some other intervening module between the IDE 112 and the code generation model(s) 118. The one or more input tokens 306 associated with the computer program 304 may be received 308 by the code generation model(s) 118, for example, via one or more messages that are received by the code generation model(s) 118, via one or more queues or other data structure that the IDE 112 inserts input tokens 306 into and that the code generation model(s) 118 retrieves input tokens 306 from, via the IDE 112 directly writing (e.g., via an RDMA or RDMA-like operation) the input tokens 306 into memory on server (124 in FIG. 1) that supports the execution of the code generation model(s) 118, or in some other way.

In the example method depicted in FIG. 3, the code generation model 118 may access information describing a domain-specific codebase. The domain-specific codebase may be embodied, for example, as the codebase for a particular business enterprise, as the codebase for a particular business unit within a business enterprise, as the codebase for some collection of software developers, as the codebase for some other entity, and so on. The information describing a domain-specific codebase can also include non-code information such as, for example, documentation associated with a code base, commit histories for code in the code base, information describing an environment some software in the code base will be executed, information describing support tickets for code in the code base, information describing bugs in the code base and their resolution, information describing whether some code was generated by a human developer or generative AI, information identifying which particular software developer wrote some code in the code base, performance information gathered during execution of some code in the code base, environmental information (e.g., schemas in a data warehouse that contains data to be used by the code, cloud infrastructure layout, Remote Procedure Call ('RPC') endpoint configurations) describing the environment that code will be executed in, infrastructure information (e.g., information about a Kubernetes pods that may be running, information about the cloud infrastructure) describing the environment that code will be executed in, and so on. The information describing a domain-specific codebase may be embodied, for example, as the data source (122 of FIG. 1) depicted in FIG. 1. Such information may be inserted into the generated code, used to drive some query, or otherwise used by one or more of the models.

In some embodiments, the code generation model(s) 118 may access information describing a domain-specific codebase, for example, by receiving information from a knowledge base that includes code in the domain-specific codebase. Such information may be received from a trained retrieval model (such as the trained retrieval model(s) 120 depicted in FIG. 1). In some embodiments, the retrieval model(s) may be distinct from the code generation model(s) 118, the retrieval model(s) may be trained on a different training set than the code generation model(s) 118, and so on. In some embodiments, multiple retrieval models may be trained to do the retrieval. These retrieval models may be used, for example, to look at a piece of code (i.e., code that is being written by a developer), compare it to some other code/search the knowledge base for the most relevant piece of code, and then present that relevant piece of code to the developer or to another model. To train these retrieval models, the models may need to be provided with many examples of code that is related so as to enable the model to identify related code. To generate a signal that relates two pieces of code, some embodiments may examine existing code repositories and look at each change that is made in the code repository and identify situations in which changing a first piece of code was followed by a second piece of code being changed, as this may be indicative of the first piece of code and the second piece of code being related. This may be especially true in some situations such as, for example, when the same user changed each piece of code in a relatively short period of time. In these embodiments, commit histories from a code management system may be examined to identify the activity described above, or other data sources may be examined to identify activity that may be taken as a signal that some pieces of code are related. In other embodiments, other information may be indicative that some pieces of code are related. For example, if two pieces of code are described in the same document (e.g., a design document), this may be an indication that the two pieces of code are related. Readers will appreciate that such signals (and other signals) may be fairly specific to code rather than language generally, so these signals may be more useful when training retrieval models that are part of a generative AI system that generates computer program code.

In some embodiments, the code generation model(s) 118 may access information describing a domain-specific codebase by retrieving, from a database that includes memories generated by examining the domain-specific codebase, one or more memories. In some embodiments one or more models are trained to store a memory corresponding to each of a plurality of tokens in a database. In such embodiments, models trained to store memories are trained from a corpus of words obtained from a specific enterprise (e.g., a domain or an entity), allowing the memories to reflect contextual information about usage of tokens in the specific enterprise. By using enterprise-specific information to generate memories for tokens, the model is able to account for a specific implementation environment and leverage preferences or criteria specific to the specific domain. For example, a code generation model 118 may be configured to leverage memories when generating suggested code 316 to insert into the computer program 304, where the memories account for coding preferences or specific libraries particular to an enterprise, such as an entity or an organization. This allows different enterprises to use a code constructs, functions, words, or other elements in a computer program in different ways or in different contexts, with the memories generated by the trained model accounting for the enterprise specific usage. In such a way, memories allow the code generation model(s) 118 to provide suggested code 316 that are tailored to the enterprise.

The example method depicted in FIG. 3 also includes generating 310, by the code generation model(s) 118, suggested code 316 to insert into the computer program 304. In the example method depicted in FIG. 3, the suggested code 316 to insert into the computer program 304 is generated based on the one or more input tokens 306 associated with the computer program 304 and information describing a domain-specific codebase.

The code generation model(s) 118 may generate 310 suggested code 316 to insert into the computer program 304, for example, by receiving an initial code snippet (or even a natural language description of a code) in the form of input tokens 306 and predicting the next token in the sequence (or intervening token when the input tokens 306 include tokens before and after a cursor or other reference point). In such an example, the code generation model(s) 118 may generate 310 suggested code 316 in the form of tokens that are generated one by one, taking into account the context provided by the preceding tokens. The code generation model(s) 118 may maintain an internal state that keeps track of the context of the code it is generating, where the context can include variables, function declarations, loops, conditionals, and other elements that are used to generate code that follows a logical and semantically correct structure. The code generation model(s) 118 may therefore be designed to understand and replicate the structure, syntax, and semantics of programming languages and computer programs that the code generation model(s) 118 can access, including those computer programs that are part of the domain-specific codebase. Readers will appreciate that the code generation model(s) 118 may generate code up to a specified length, until a specific stop token is reached, or in some other way.

Figure 4:
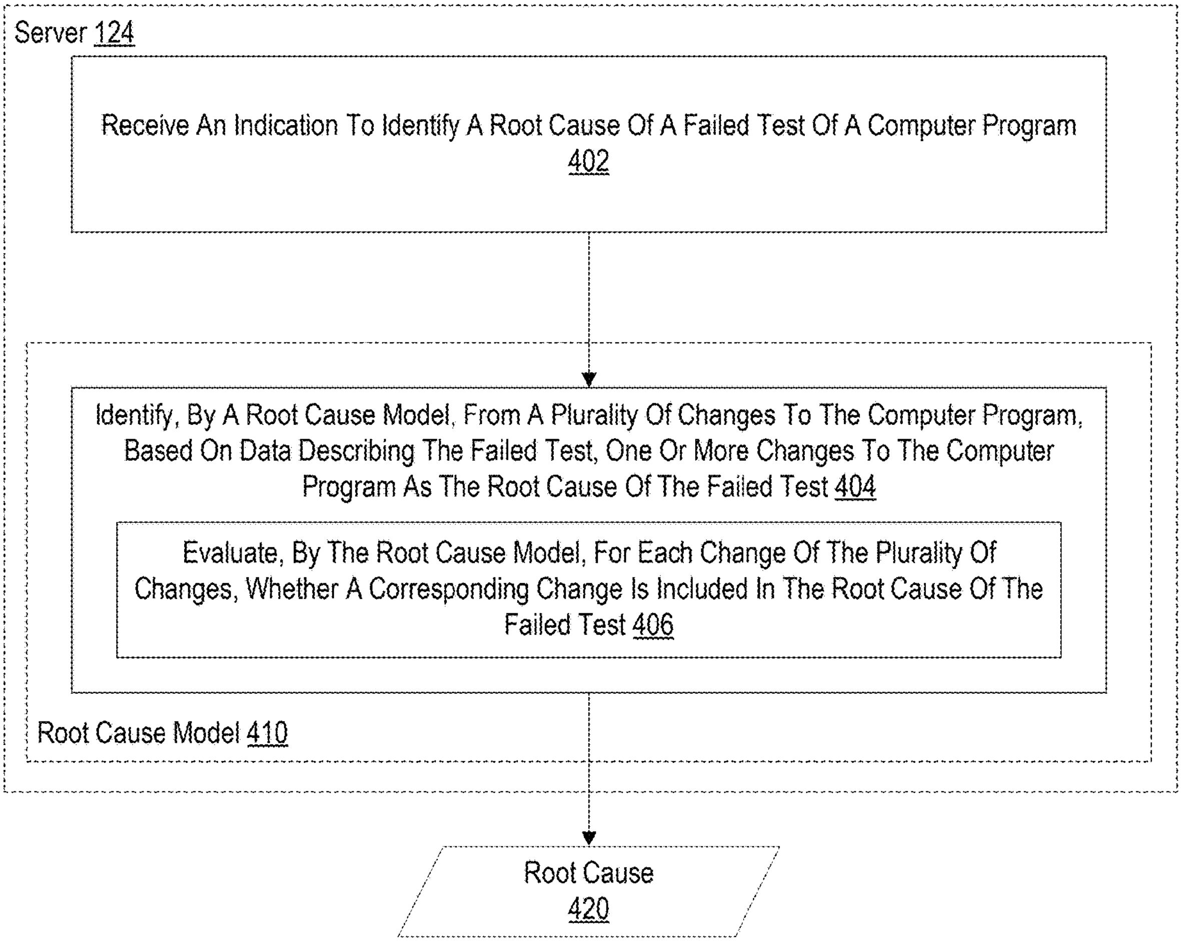
FIG. 4 sets forth a flowchart of an example method root cause analysis for computer programs in accordance with some embodiments of the present disclosure.

For further explanation, FIG. 4 sets forth a flowchart of an example method of root cause analysis for computer programs in accordance with some embodiments of the present disclosure. The method of FIG. 4 may be performed, for example, in a server 124 of FIG. 1. The method of FIG. 4 includes receiving 402 an indication to identify a root cause 420 420 of a failed test of a computer program. In some embodiments, the test may include a test case that defines a set of inputs, execution conditions, testing procedures, and/or expected results to verify and/or validate the functionality of some aspect of the computer program. In some embodiments, the test may include a test case executed as part of a Continuous Integration/Continuous Delivery (CI/CD) pipeline for developing the computer program. For example, in some embodiments, the test may include a test cause automatically executed in response to an attempt to commit or merge some amount of updated or new code into a code base of the computer program. Here, the test may have failed due to not providing a result or output that matches the expected results, due to being unable to complete execution due to some error in execution, or due to other conditions as can be appreciated.

The root cause 420 420 of a failed test includes one or more changes to the code of the computer program that caused the test to fail. For example, assume that the computer program was previously in a state where the test passed (e.g., a "passing state"). The code of the computer program may have been subject to potentially many changes since the passing state in order to reach the state where the test was executed and failed (e.g., a "failing state"). In some embodiments, some of these changes may not have contributed to the computer program failing the test while others did. For example, changes may have been made to portions of the code of the computer program that are not executed when executing the test, or changes may have been made to portions of the code that are executed when executing the test but nonetheless did not contribute to the computer program failing the test. Accordingly, these changes to the code of the computer program that contributed to the computer program failing the test are considered to be the root cause 420 of the failed test.

In some embodiments, the test may be executed in response to a test command executed in a local shell of a computing device, such as the computing device of a user or developer editing the code of the computer program. For example, in some embodiments, an IDE 112 extension may cause the test command to be executed in the local shell. In some embodiments, executing the test command may include executing one or more user-configurable setup commands executed prior to the test command. Such setup commands may include, for example, commands that cause the test command, and therefore the computer program, to be executed in a container or virtual environment, to use a remote connection, and the like.

In some embodiments, receiving 402 the indication to identify the root cause 420 of the failed test may include receiving a user command or input to identify the root cause 420 of the failed test. For example, in some embodiments, the user may input a command or input to the IDE 112, to a shell or command line interface (CLI), or into another interface as can be appreciated. In some embodiments, receiving 402 the indication to identify the root cause 420 of the failed test may include receiving a command or signal from a process that monitors the shell or CLI for output from executing the test that indicates the failed test. This may include, for example, detecting a return code for a test that indicates failure or success. In some embodiments, where a return code may not be used or may not be enough to determine test failure or success, a configurable regular expression (regex) may be applied to the output of test execution to determine success or failure of the test. In some embodiments, this may cause a user to be prompted, via the CLI, IDE 112, or another interface, for an indication as to whether the root cause 420 of the failed test should be identified. In some embodiments, such as where the test is executed as part of a CI/CD pipeline, a background process may monitor for failed tests and, in response to a failed test, automatically generate the indication to identify the root cause 420 of the failed test. Receiving 402 the indication to identify the root cause 420 of the failed test may also be performed according to other approaches as can be appreciated.

The method of FIG. 4 also includes identifying 404, by a root cause model 410, from a plurality of changes to the computer program, based on data describing the failed test, one or more changes to the computer program as the root cause 420 of the failed test. In some embodiments, the root cause model 410 is a trained machine learning model, such as a large language model (LLM) or other generative AI model, that identifies, as the root cause 420 of the failed test, the particular changes to the computer program that caused the test to fail. In some embodiments, the root cause model 410 may include a specifically trained model. In other words, in some embodiments, the root cause model 410 may be trained or fine-tuned based on training data specifically related to identifying root cause 420 of failed tests in computer programs. Particular approaches for training the root cause model 410 will be described in further detail below. In some embodiments, the root cause model 410 may include a general-purpose model. In other words, in some embodiments, the root cause model 410 may not be specifically trained to identify root cause 420 of failed tests in computer programs. Accordingly, in some embodiments, a general-purpose model used as the root cause model 410 may identify root cause 420 of failed tests in a computer program using prompt engineering, additional contextual information, and the like despite not being specifically trained.

The root cause model 410 may accept, as input, data describing a plurality of changes to the computer program and data describing the failed test. In some embodiments, the root cause model 410 may also accept other inputs, to be described in further detail below, that may be used by the root cause model 410 as additional contextual information potentially useful in identifying the root cause 420 of the failed test. In some embodiments, the data describing the failed test may include an output from executing the test, such as a return code or other output as can be appreciated that indicates that the test failed. In some embodiments, the data describing the failed test may include one or more expected values or conditions that would cause the test to pass and/or one or more actual values from execution the test that caused the test to fail. In some embodiments, the data describing the failed test may include data describing an execution path of the computer program when executing the test. This may include, for example, a stack trace, output from executed debug statements, and the like.

In some embodiments, the data describing the failed test may include a natural language explanation or description may include one or more natural language explanations or descriptions related to the failed test. For example, in some embodiments, the data describing the failed test may include a natural language explanation of the test itself, descriptions of the code tested by the test (e.g., of particular methods or combinations of methods), explanations of why the test failed, and the like. In some embodiments, these natural language explanations or descriptions may be generated by an LLM or other generative AI model. In some embodiments, these natural language explanations or descriptions may be generated based on log data generated during execution of the failed test, portions of code of the computer program, and the like. In some embodiments, these natural language explanations or descriptions may be user-provided. For example, a user may provide one or more of these natural language explanations or descriptions via an IDE 112, CLI, or other interface as can be appreciated. In some embodiments, these interfaces may include interfaces for testing and/or developing the computer program, help interfaces such as chat interfaces, and the like.

In some embodiments, data describing a passing execution of the test may also be included as input to the root cause model 410. For example, the data describing a passing execution of the test may include similar data as is set forth above with respect to the data describing the failed test, instead describing an execution of the test using an earlier version of the computer program in a passing state. For example, the data describing a passing execution of the test may include data describing an execution path, debug statements, or other log data as can be appreciated when executing the test using the earlier version of the computer program in the passing state. This may be used, for example, by the root cause model 410 to identify differences in the execution paths, affected data, or other information between passing and failing instances of the test.

The data describing the plurality of changes to the computer program may be accessed by the root cause model 410 itself. For example, various data sources such as a code repository for the computer program may expose application program interfaces (APIs) or other interfaces accessible to the root cause model 410. The root cause model 410 may access the data describing the plurality of changes to the computer program using these interfaces in response to receiving the data describing the failed test and/or other input data. In some embodiments, the data describing the plurality of changes to the computer program may be accessed by and provided to the root cause model 410 from another source, such as a retrieval model 120 as described above. In some embodiments, the retrieval model 120 may access the data describing the plurality of changes to the computer program in response to a request from the root cause model 410 or another process or service as can be appreciated. In some embodiments, the data describing the plurality of changes to the computer program may be generated by the root cause model 410 based on some other data accessed or received according to similar approaches as are described above.

In some embodiments, the data describing the plurality of changes to the computer program may be generated by accessing code of the computer program in a passing state, such as a last or most recent passing state of the computer program. For example, in some embodiments, code of the computer program in a passing state may include a main branch of the code of the computer program accessed from a code repository or version control system for the computer program. Continuing with this example, where a CI/CD pipeline requires that code pass testing before being merged into the code base, this ensures that the most recent main branch of the computer program is in a passing state. The data describing the plurality of changes to the computer program may then be generated by comparing the code of the computer program in the passing state to the code of the computer program in the failing state (e.g., the state of the computer program when the test was executed and failed). For example, a diff function or other function may be used to identify differences between the computer program in the passing state and the computer program in the failing state, with these differences being encoded in the data describing the plurality of changes to the computer program.

Given the data describing the plurality of changes to the computer program, the root cause model 410 then determines which of these changes are included in the root cause 420 of the failed test. Accordingly, in some embodiments, identifying 404, by a root cause model 410, from a plurality of changes to the computer program, based on data describing the failed test, one or more changes to the computer program as the root cause 420 of the failed test includes evaluating 406, by the root cause model 410, for each change of the plurality of changes, whether a corresponding change is included in the root cause 420 of the failed test. In other words, in the root cause model 410 classifies each change, potentially across a large number of changes, with the classification including an indication as to whether a corresponding change is included in the root cause 420 of the failed test.

In some embodiments, the root cause model 410 may provide, for each change, a binary classification as to whether a corresponding change is included in the root cause 420 of the failed test. For example, each change may be classified as being included in the root cause 420 of the failed test or not included in the root cause 420 of the failed test. In some embodiments, the root cause model 410 may assign, to each change, a non-binary classification indicating a likelihood that a corresponding change is in the root cause 420 of the failed test. For example, each change may be classified as unlikely, somewhat likely, or highly likely as being included in the root cause 420 of the failed test. Readers will appreciate that these potential classifications are merely illustrative and that other potential classifications are contemplated within the scope of the present disclosure. In some embodiments, the root cause model 410 may assign, to each change, a score indicating a likelihood that a corresponding change is included in the root cause 420 of the failed test. Other approaches may also be used by the root cause model 410 in evaluating 406 each change of the plurality of changes.

Various actions may be performed in response to identifying 404 the root cause 420 of the failed test. In some embodiments, an indication of the root cause 420 may be presented to a user via a CLI, IDE 112, or other interface as can be appreciated. For example, in some embodiments, particular portions of code corresponding to the root cause 420 of the failed test may be highlighted or otherwise indicated to the user. This may allow the user to edit these portions of code so as to correct the failed test. As another example, in some embodiments, a listing or enumeration of those changes included in the root cause 420 may be presented to the user. This may include, for example, presenting changes classified as being included in the root cause 420 according to a binary classification, presenting changes with a particular classification of multiple possible classifications (e.g., highly likely), presenting changes with a score exceeding some threshold, and the like.

In some embodiments, a listing or enumeration of each change may be presented with their corresponding classification from the root cause model 410 (e.g., their particular classification, score, and the like). In embodiments where a listing or enumeration of changes are presented (e.g., either for all changes or a subset thereof), the listing or enumeration may include a natural language description of each change, a natural language explanation of why each change received their classification from the root cause model 410, or other natural language information as can be appreciated. Such natural language information may be generated by the root cause model 410 or by another generative AI model. As will be described in further detail below, in some embodiments, a user may then update or modify the root cause 420 as identified by the root cause model 410.

In some embodiments, as will be described in further detail below, the identified 404 root cause 420 may be used to generate suggested code 316 using a code generation model 118. For example, the root cause 420 may be provided as input to the code generation model 118 to generate suggested code 316 to correct the failed test. In some embodiments, a user interaction with a presentation of the root cause 420 may also be used in generating suggested code 316 to correct the failed test.

Readers will appreciate that the approaches set forth above allow for the root cause 420 of failed tests to be identified. This may assist in informing users as to changes that caused the test to fail to prevent introducing similar changes in the future and may assist guiding users to portions of code that need to be corrected in order for the test to pass, improving the user experience and system utility.

This may also assist in automatically generating suggested code for correcting failed tests, improving system performance and resilience.

Figure 5:
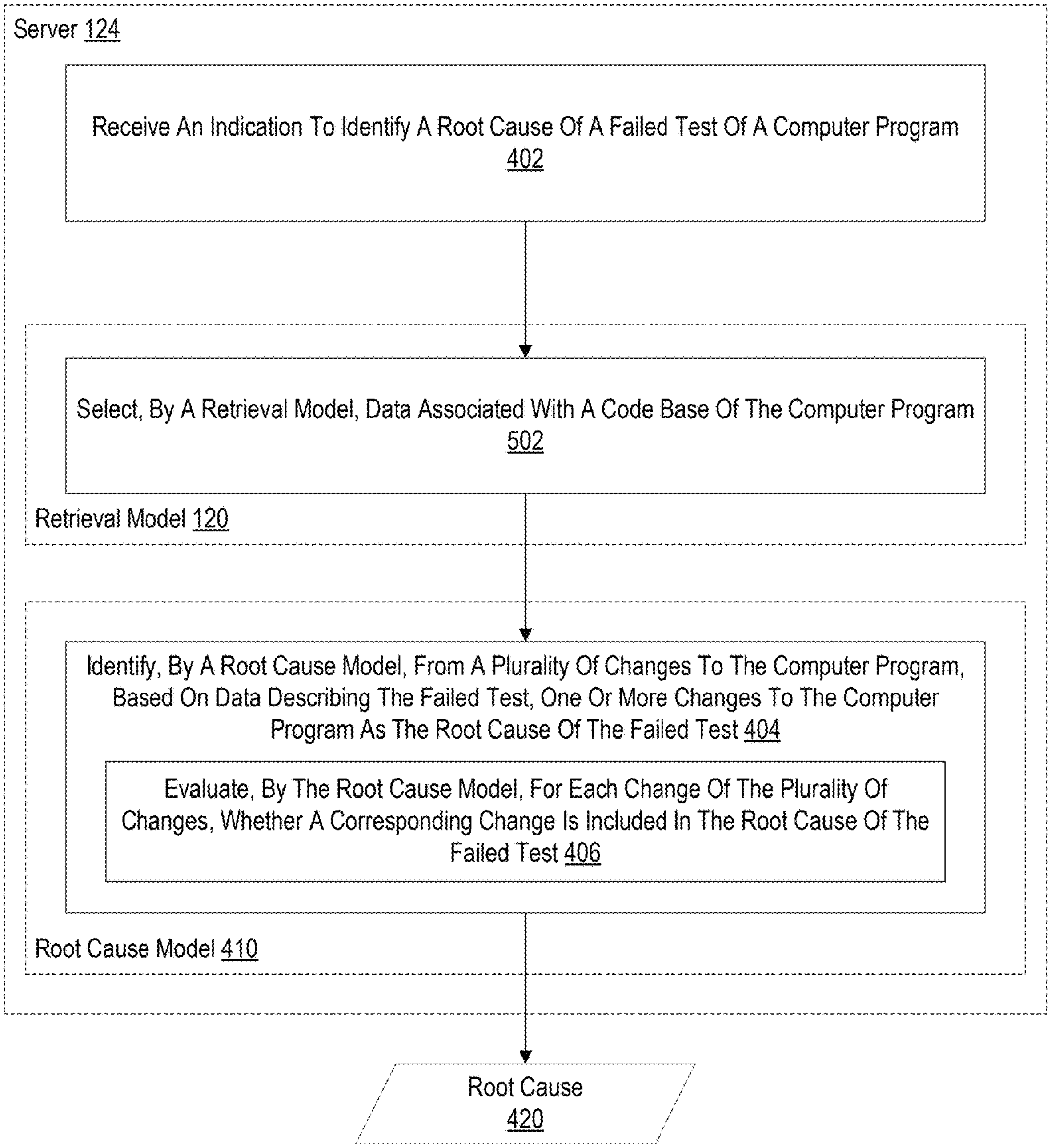
FIG. 5 sets forth a flowchart of another example method root cause analysis for computer programs in accordance with some embodiments of the present disclosure.

For further explanation, FIG. 5 sets forth a flowchart of another example method of root cause analysis for computer programs in accordance with some embodiments of the present disclosure. The method of FIG. 5 is similar to FIG. 4 in that the method of FIG. 5 also includes: receiving 402 an indication to identify a root cause 420 of a failed test of a computer program; and identifying 404, by a root cause model 410, from a plurality of changes to the computer program, based on data describing the failed test, one or more changes to the computer program as the root cause 420 of the failed test, including: evaluating 406, by the root cause model 410, for each change of the plurality of changes, whether a corresponding change is included in the root cause 420 of the failed test.

The method of FIG. 5 differs from FIG. 4 in that the method of FIG. 5 includes selecting 502, by a retrieval model 120, data associated with a code base of the computer program. As is set forth above, in some embodiments, the root cause model 410 may accept additional information that serves as contextual information in identifying 404 the root cause 420 of the failed test. Accordingly, in some embodiments, a retrieval model 120 may access data associated with a code base of the computer program to serve as this additional information.

In some embodiments, selecting 502, by the retrieval model 120, the data associated with the code base of the computer program may be performed in response to receiving 402 the indication to identify the root cause 420 of the failed test. In some embodiments, the data describing the failed test described above may be provided as input to the retrieval model 120 in order to select 502 the data associated with the code base of the computer program. In some embodiments, the data associated with the code base of the computer program may be pre-fetched or loaded independent of any particular failed test or received 402 indication to identify a root cause 420 of a failed test.

In some embodiments, the data associated with the code base of the computer program may include portions of the code base of the computer program itself (e.g., portions of source code). In some embodiments, the data associated with the code base of the computer program may include a commit history for the code base of the computer program. A commit history for the code base of the computer program may describe particular changes performed by code commits, comments applied to these commits, user information for users that submitted these commits, and the like. In some embodiments, the data associated with the code base of the computer program may include a pull history for the code base of the computer program. A pull history for the code base of the computer program may include data describing particular pull requests, including the changes to be merged by the pull requests, user information for users that submitted, approved, or rejected the pull requests, indications as to whether a pull request was accepted or rejected, comments for pull requests, and the like.

In some embodiments, the data associated with the code base of the computer program may include non-code data associated with the code base of the computer program such as documentation, design documents, or other data as can be appreciated. In some embodiments, the data associated with the code base of the computer program may include code or non-code data as described above for other, related code bases. For example, the data associated with the code base of the computer program may include code or non-code data for code bases of other computer programs for the same organization, edited by similar or identical users, or other data as can be appreciated.

The selected 502 data associated with the code base of the computer program may be provided as input to the root cause model 410 for identifying 404 the root cause 420 of the failed test. In other words, in some embodiments, the root cause 420 of the failed test may be identified 404 based on the data associated with the code base of the computer program. In some embodiments, as will be described in further detail below, the selected 502 data associated with the code base of the computer program may be provided as input to a code generation model 118 to generate suggested code 316 for correcting the failed test. Accordingly, in some embodiments, the data associated with the code base of the computer program may be used in generating suggested code 316 by a code generation model 118 instead of or in addition to identifying 404 the root cause 420 of the failed test by the root cause model 410.

Figure 6:
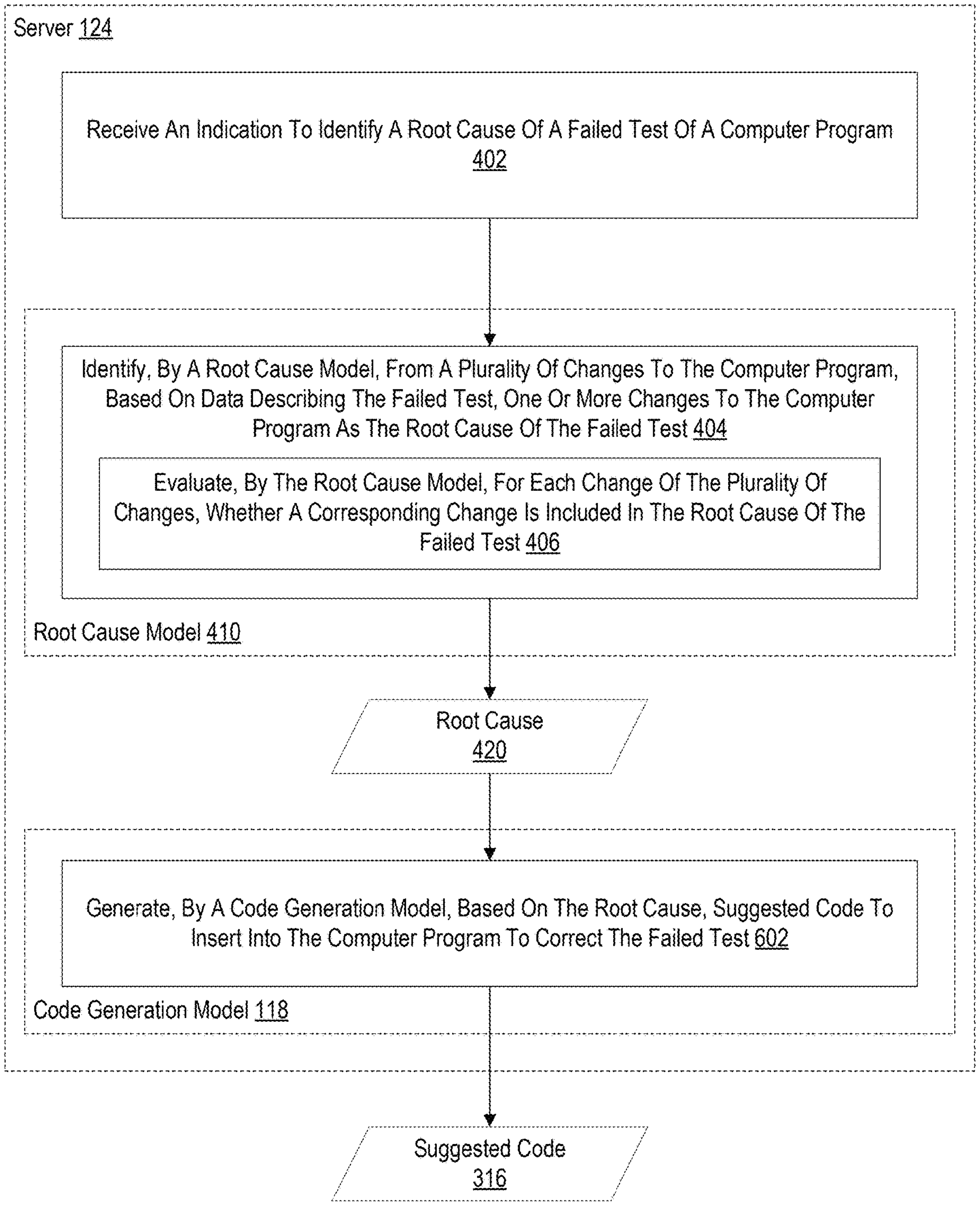
FIG. 6 sets forth a flowchart of another example method root cause analysis for computer programs in accordance with some embodiments of the present disclosure.

For further explanation, FIG. 6 sets forth a flowchart of another example method of root cause analysis for computer programs in accordance with some embodiments of the present disclosure. The method of FIG. 6 is similar to FIG. 4 in that the method of FIG. 6 also includes: receiving 402 an indication to identify a root cause 420 of a failed test of a computer program; and identifying 404, by a root cause model 410, from a plurality of changes to the computer program, based on data describing the failed test, one or more changes to the computer program as the root cause 420 of the failed test, including: evaluating 406, by the root cause model 410, for each change of the plurality of changes, whether a corresponding change is included in the root cause 420 of the failed test.

The method of FIG. 6 differs from FIG. 4 in that the method of FIG. 6 also includes generating 602, by a code generation model 118, based on the root cause 420, suggested code 316 to insert into the computer program to correct the failed test. Generating 602, by the code generation model 118, suggested code 316 to insert into the computer program to correct the failed test may be performed according to similar approaches as are set forth above for generating suggested code 316. The suggested code 316 is generated 602 such that the computer program, after having the suggested code 316 inserted, will pass the previously failed test. Inserting suggested code 316 may include adding some portion of suggested code 316, replacing some existing code with suggested code 316, removing some amount of existing code, or combinations thereof.

The code generation model 118 may accept, as input, the root cause 420 and the data describing the failed test. In some embodiments, the code generation model 118 may accept data associated with a code base of the computer program retrieved by a retrieval model 120 as described above. In some embodiments, the code generation model 118 may accept, as input, additional data retrieved by the retrieval model 120 according to similar approaches as are set forth above.

In some embodiments, the code generation model 118 may accept, as input, data describing one or more locations to edit to correct the failed test. Thus, the suggested code 316 may be generated for insertion at the one or more locations to correct the failed test. In some embodiments, the one or more locations to edit may be determined by a location model. In some embodiments, the location model includes a specifically trained model, such as a specifically trained generative AI model, that is trained to identify locations in code to edit to correct failed tests based on a corpus of training data describing failed tests and edits to code. In some embodiments, the location model includes a general-purpose model that is not specifically trained to identify locations in code to edit to correct failed tests. The location model may accept, as input, data describing the failed test, data associated with the code base of the computer program retrieved by the retrieval model, data indicating the root cause 420, and/or other data as can be appreciated.

Figure 7:
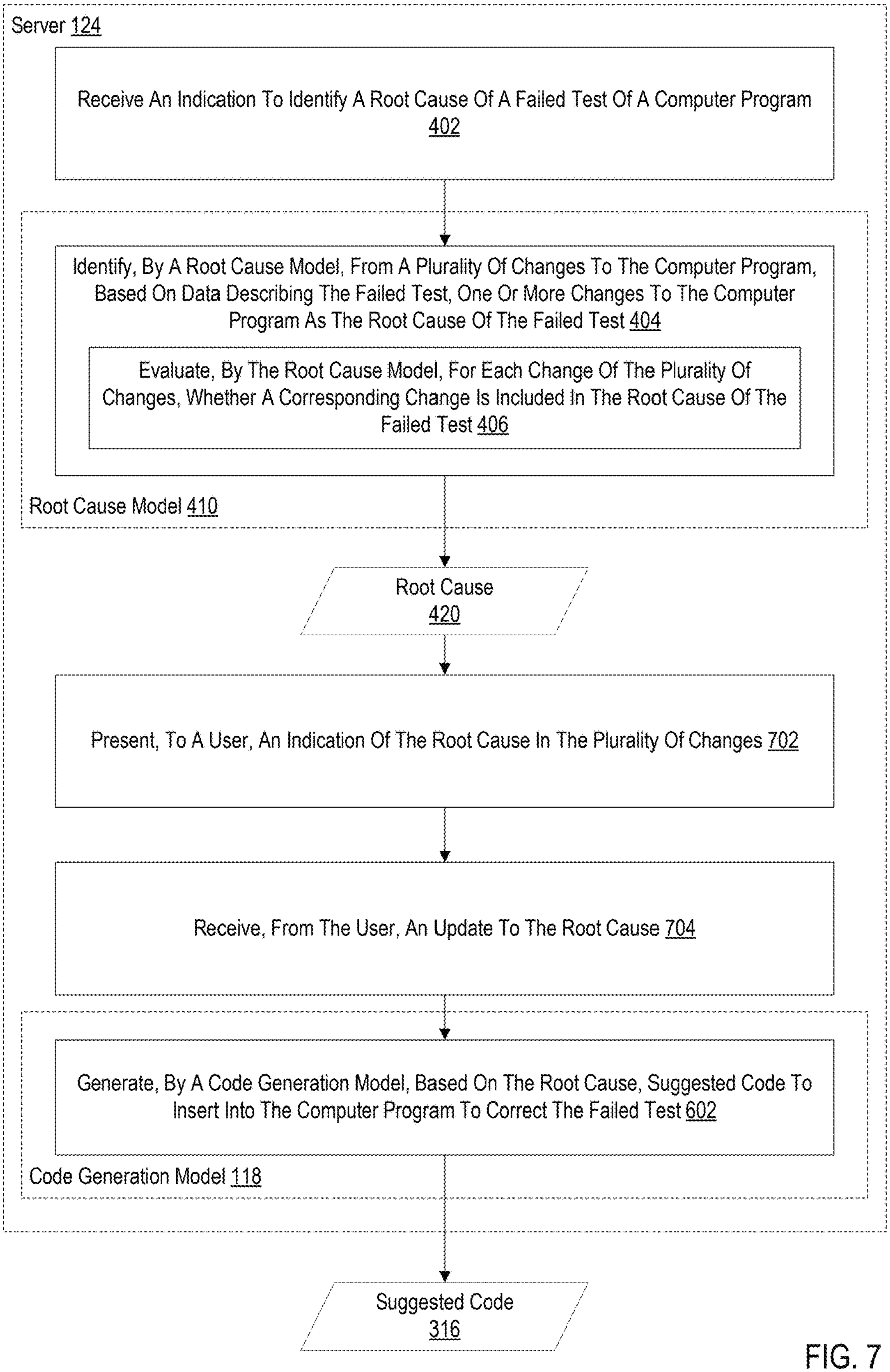
FIG. 7 sets forth a flowchart of another example method root cause analysis for computer programs in accordance with some embodiments of the present disclosure.

For further explanation, FIG. 7 sets forth a flowchart of another example method of root cause analysis for computer programs in accordance with some embodiments of the present disclosure. The method of FIG. 7 is similar to FIG. 6 in that the method of FIG. 7 also includes: receiving 402 an indication to identify a root cause 420 of a failed test of a computer program; and identifying 404, by a root cause model 410, from a plurality of changes to the computer program, based on data describing the failed test, one or more changes to the computer program as the root cause 420 of the failed test, including: evaluating 406, by the root cause model 410, for each change of the plurality of changes, whether a corresponding change is included in the root cause 420 of the failed test; and generating 602, by a code generation model 118, based on the root cause 420, suggested code 316 to insert into the computer program to correct the failed test.

The method of FIG. 7 differs from FIG. 6 in that the method of FIG. 7 also includes presenting 702, to a user, an indication of the root cause in the plurality of changes. In some embodiments, presenting 702, to the user, the indication of the root cause 420 may include presenting 702 a listing or enumeration of the plurality of changes via a CLI, IDE 112, or other interface as can be appreciated. This listing or enumeration may include, for each change of the plurality of changes, a corresponding classification from the root cause model 410. For example, this listing or enumeration may include, for each change, an indication whether the change was or was not classified for inclusion in the root cause 420, a classification, label, or score indicating a likelihood that the change is included in the root cause 420, natural language descriptions or explanations related to each change, and the like.

The method of FIG. 7 also includes receiving 704, from the user, an update to the root cause 420. In some embodiments, the interface for presenting 702 the indication of the root cause 420 in the plurality of changes may accept user inputs to override, for each change, the classification from the root cause 420. This may include, for example, checkboxes, dropdown menus, buttons, and the like. For example, where a given change is indicated as included in the root cause 420, a user may override this classification to exclude the given change from the root cause 420. As another example, where a given change is not indicated as included in the root cause 420, a user may override this classification to include the given change in the root cause 420.

Accordingly, where a user has updated the root cause 420, generating 602 suggested code 316 to correct the failed test or other operations may be performed based on the updated root cause. In some embodiments, updates to a determined root cause 420 may be stored as training data or feedback for retraining or fine-tuning the root cause model 410. Readers will appreciate that the approaches set forth herein allow for user steering or guidance in identifying a root cause 420 for a failed test.

Figure 8:
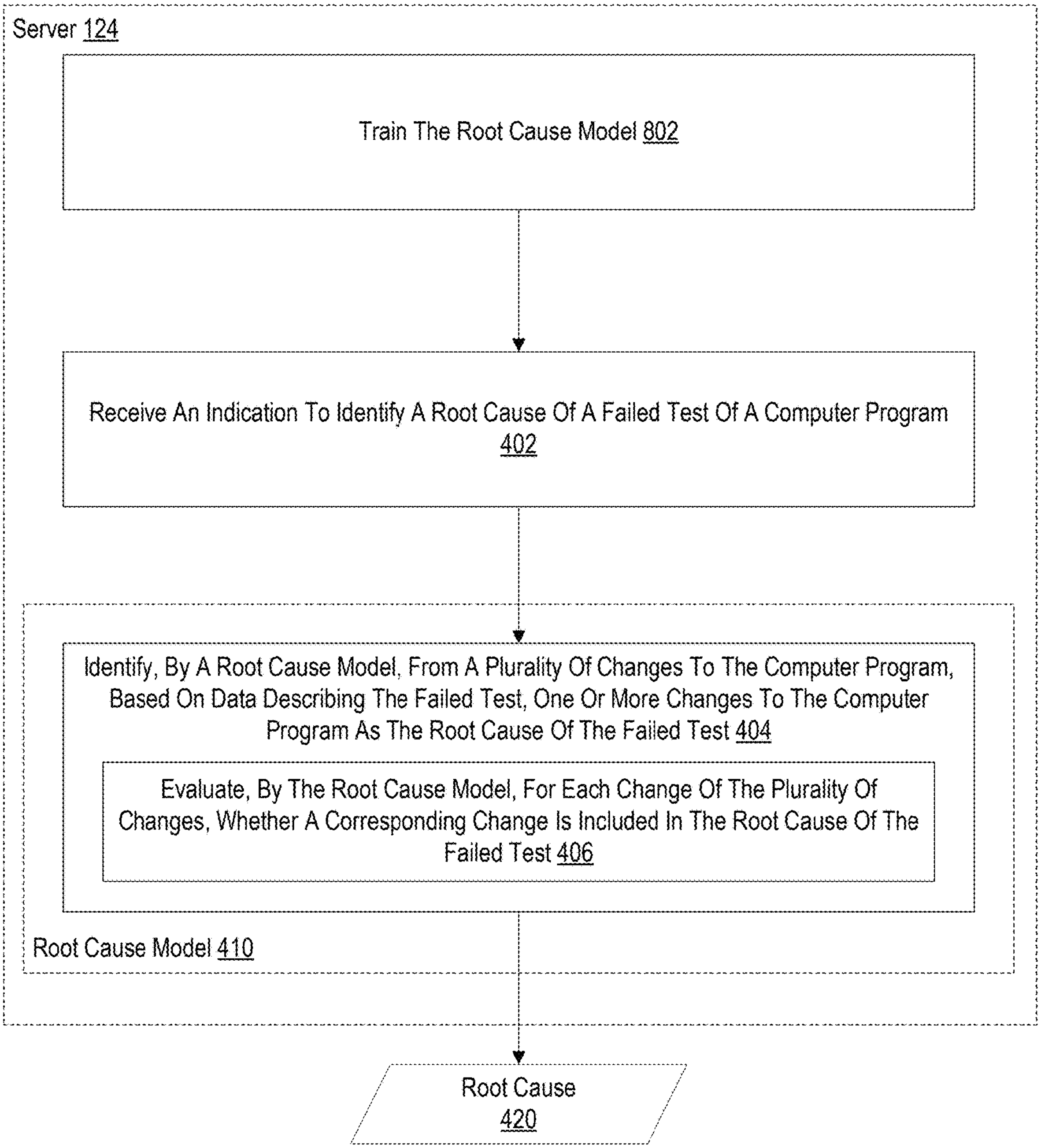
FIG. 8 sets forth a flowchart of another example method root cause analysis for computer programs in accordance with some embodiments of the present disclosure.

For further explanation, FIG. 8 sets forth a flowchart of another example method of root cause analysis for computer programs in accordance with some embodiments of the present disclosure. The method of FIG. 8 is similar to FIG. 4 in that the method of FIG. 8 also includes: receiving 402 an indication to identify a root cause 420 of a failed test of a computer program; and identifying 404, by a root cause model 410, from a plurality of changes to the computer program, based on data describing the failed test, one or more changes to the computer program as the root cause 420 of the failed test, including: evaluating 406, by the root cause model 410, for each change of the plurality of changes, whether a corresponding change is included in the root cause 420 of the failed test.

The method of FIG. 8 differs from FIG. 4 in that the method of FIG. 8 also includes training 802 the root cause model 410. As is set forth above, in some embodiments, the root cause model 410 may include a specifically trained model, such as a specifically trained generative AI model, that is trained to identify changes to code that cause failed tests. Accordingly, the root cause model 410 may be trained using a corpus of training data related to failed tests, code changes, and the like.

In some embodiments, the corpus of training data may include multiple samples with each sample (e.g., each tuple) including data describing a code change that introduced a test failure, data describing the test failure, and data describing another code change that corrected the test failure. For example, data describing a code change that introduced a test failure may include data describing changes to some code that previously passed the test, with the changed code failing the test. As another example, data describing the test failure may include an output from executing the failed test, stack traces or other execution information related to execution of the failed test, and the like. As a further example, data describing another code change that corrected the test failure may include data indicating the particular changes to the code between when the code failed the test and when the code passed the test, comments to code commits or pull requests related to these particular changes, data describing execution of the passing test (e.g., output from test execution, debug or trace information, and the like), or other data as can be appreciated.

In some embodiments, these samples of training data may be extracted (e.g., automatically and/or manually) from log data related to code and/or test execution. In some embodiments, these samples of training data may be extracted from public code repositories and/or private code repositories. In some embodiments, the root cause model 410 may be periodically retrained and/or fine-tuned based on updated or additional training data. For example, retraining or fine-tuning of the root cause model 410 may be performed in response to a user command or input, at a predefined time interval, in response to aggregating or accruing a threshold amount of updated or additional training data, or in response to other events.

Readers will appreciate that while the embodiments described above relate to embodiments where actions are performed in response to a failed test (e.g., receiving an indication to identify a root cause of a failed test of a computer program; identifying, by a root cause model, from a plurality of changes to the computer program, based on data describing the failed test, one or more changes to the computer program as the root cause of the failed test; and others), in other embodiments these embodiments may be performed in response to a detected error. For example, embodiments can include receiving an indication to identify a root cause of a detected error for a computer program and identifying, by a root cause model, from a plurality of changes to the computer program, based on data describing the detected error, one or more changes to the computer program as the root cause of the detected error. In these examples, error logs, error records, error codes, or other information that is generated in response to the occurrence of some error during the execution of a computer program may be used to help perform such steps.

Figure 9:
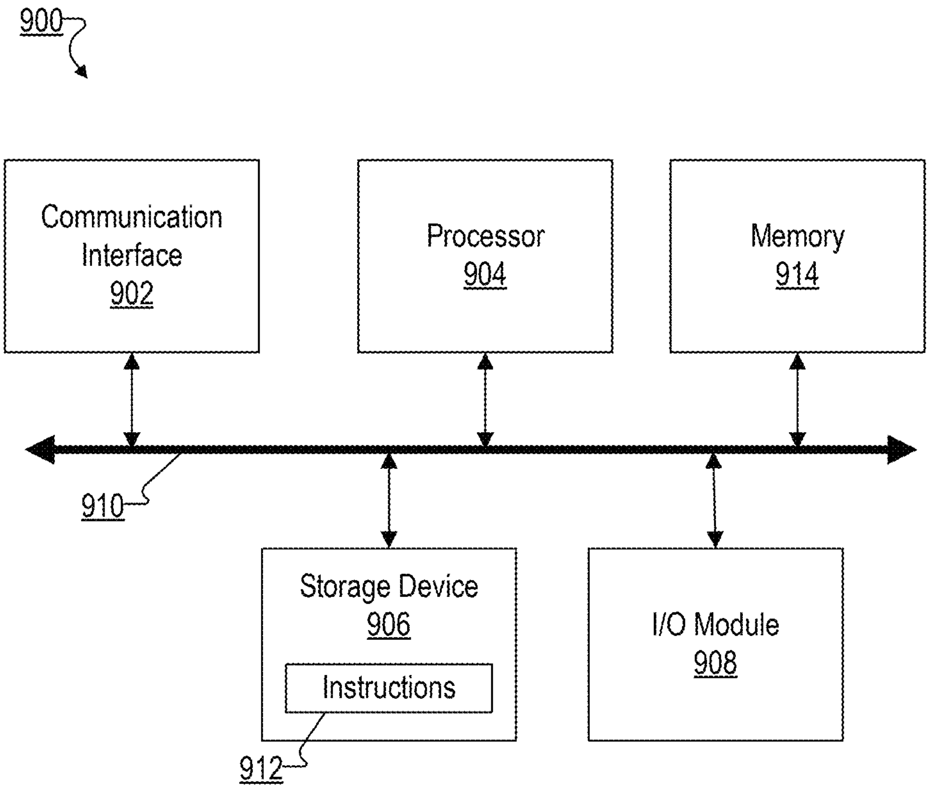
FIG. 9 illustrates an exemplary computing device that may be specifically configured to perform one or more of the processes described in the present disclosure.

To illustrate examples of technologies that may be used to implement the approaches set forth herein, FIG. 9 illustrates an exemplary computing device 900 that may be specifically configured to perform one or more of the processes described herein. As shown in FIG. 9, computing device 900 may include a communication interface 902, a processor 904, a storage device 906, an input/output (I/O) module 908, and computer memory 914 communicatively connected one to another via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data and/or interpreting, executing, and/or directing execution of one or more of the instructions, processes, and/or operations described herein. Processor 904 may perform operations by executing computer-executable instructions 912 (e.g., an application, software, code, and/or other executable data instance) stored in storage device 906. Although not explicitly illustrated in FIG. 9, processor 904 can include multiple cores. Each core may be embodied, as an distinct processing unit that may independently execute instructions, meaning that the processor 904 can process data and run tasks in parallel.

Storage device 906 may include one or more data storage media, devices, or configurations and may employ any type, form, and combination of data storage media and/or device. For example, storage device 906 may include, but is not limited to, any combination of non-volatile media and/or volatile media. Electronic data, including data described herein, may be temporarily and/or permanently stored in storage device 906. For example, data representative of computer-executable instructions 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 900.

Figure 10:
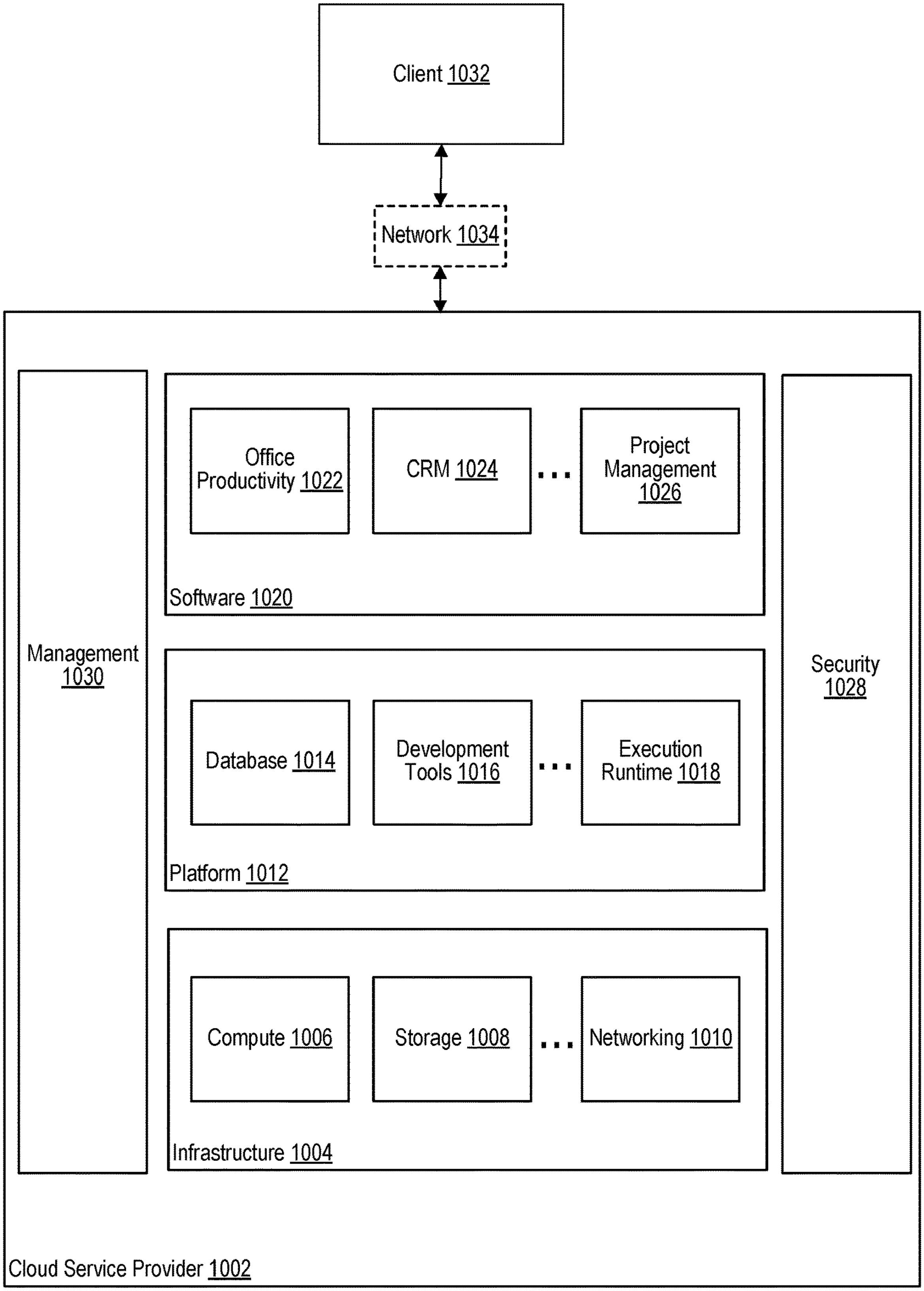
FIG. 10 sets forth a block diagram of a cloud service provider service architecture in accordance with some embodiments of the present disclosure.

For further explanation and as an additional example of a supporting technology for performing the functions described herein, FIG. 10 sets forth a block diagram of a cloud service provider 1002 service architecture in accordance with some embodiments. The cloud service provider 1002 can deliver a variety resources to a client 1032 via a network 1034 through a services-based consumption model where resources are consumed on-demand and as-a-service. Cloud service providers can provide services via cloud platforms such as, for example, Microsoft Azure™, Amazon Web Services ('AWS')™, Google Cloud Platform ('GCP')™, and others.

FIG. 10 depicts an embodiment where software 1020 is delivered as a service. Software-as-a-service ('SaaS') is a model where software applications are delivered over the internet as-a-service. Rather than installing and maintaining software locally, users can access software via a web browser or other network connected interface, eliminating the need for complex software and hardware management on the client-side. In FIG. 10, as examples of software 1020 that can be delivered as-a-service, the illustrated embodiment includes office productivity 1022 software, customer relationship management ('CRM') 1024 software, and project management 1026 software. The office productivity 1022 software can include applications designed to facilitate common business and personal tasks, including word processing applications, applications for spreadsheet creation, presentation design applications, and many others. The CRM 1024 software can include applications for managing a business organization's relationships and interactions with customers and potential customers. The project management 1026 software can include applications designed to help teams plan, organize, and manage projects efficiently by facilitating collaboration and tracking the progress of projects. Readers will appreciate that in other embodiments, other types of software may be delivered using a SaaS model.

FIG. 10 depicts an embodiment where platforms 1012 can be delivered as a service. Platform-as-a-service ('PaaS') is a model that provides cloud customers with platform resources that they can use to develop, run, and manage applications without the complexity of such deploying and managing such infrastructure on their own. In FIG. 10, as examples of platform 1012 resources that can be delivered as-a-service, the illustrated embodiment includes database 1014 services, development tools 1016 services, and execution runtime 1018 services. The database 1014 services can be used to provide access to databases without management overhead for the user as the cloud service provider manages the provisioning, scaling, and maintenance of the databases. The development tools 1016 services can provide developers with tools to design, develop, test, and deploy applications without needing to manage the underlying infrastructure. The execution runtime 1018 services can provide environments where applications or other forms of computer program code can be executed, including services to scale the execution environment. Readers will appreciate that in other embodiments, other platform resources may be delivered using a PaaS model.

FIG. 10 depicts an embodiment where infrastructure 1004 can be delivered as a service. Infrastructure-as-a-Service ('IaaS') is a model that provides virtualized computing resources over the internet, such that infrastructure such as servers, storage, networks, and others may be leased on demand rather than purchasing and maintaining physical hardware. In FIG. 10, as examples of infrastructure 1004 resources that can be delivered as-a-service, the illustrated embodiment includes compute 1006 services, storage 1008 services, and networking 1010 services. The compute 1006 services can be used to provide on-demand access to computational resources such as VMs, containers, and serverless functions, where the cloud service provider manages the provisioning, scaling, and maintenance of such resources. The storage 1008 services can provide storage resources that can be used to store and access data, without the need for customers to purchase and manage on-premises physical storage resources. The networking 1010 services can provide the ability to create and manage virtualized networking resources such as, for example, virtual private networks ('VPNs'), firewalls, load balancers, and more. Readers will appreciate that in other embodiments, other infrastructure resources may be delivered using a PaaS model.

The cloud service provider of FIG. 10 also provides management 1030 resources. The management 1030 resources can include, for example, tools and interfaces that enable customers to efficiently deploy, monitor, and manage, their cloud services. Such tools can include web-based management consoles, command-line interfaces ('CLIs'), APIs, automation tools, and other tools.

The cloud service provider of FIG. 10 also provides security 1028 resources. The security 1028 resources can include, for example, tools and services to help customers protect their cloud environments and ensure compliance with security standards. These tools and services may provide specific aspects of security, including identity and access management, network security, threat detection, compliance management, and others.

Readers will appreciate that many of the components described above may be delivered as services from a cloud service provider. For example, the virtual machines, containers, and pods described above may all be delivered via a cloud service provider. In other embodiments, other forms of compute resources may be used in place of the virtual machines or other compute resource. For example, AWS EC2 instances or other form of cloud compute instances may be utilized in place of the virtual machines.

Readers will appreciate that while some the examples described above relate to embodiments where a client device leverages an IDE 112 that is used to receive suggested code and present code completion recommendations to a software developer or similar user, readers will appreciate that other embodiments are within the scope of the present disclosure. More specifically, the server or code generation model(s) 118 may be used to provide suggested code or code completion recommendations to other entities (e.g., clients other than an IDE 112 on a client device). Readers will appreciate that the client may be any type of a software development tool that software developers (or other entities that create software/code) interact with. Clients may include not only IDEs, but also code review tools, code hosting tools (e.g., GitHub), collaboration tools (like Slack or Notion), AI agents, and so on. Readers will further appreciate that a client of the server or code generation model(s) 118 may run, for example, on a software developer's computer (as is the case with an IDE), on a server or in the cloud (e.g., code review tools, code hosting tools, AI agents), or in some other environment.

In some embodiments, a client device presents content to a user via one or more output devices (e.g., a display, a speaker, a tactile feedback system, etc.) and receives one or more inputs from a user through one or more input devices (e.g., a keyboard, a touchscreen, a mouse, etc.). In various embodiments, content presented to the user via the client device is retrieved from one or more files locally stored by the client device. The files from which content is displayed to the user are obtained by the client device from a server or from another source in some embodiments. In other embodiments, the files are locally generated at the client device based on inputs received from the user and stored by the client device. In various embodiments, the client device includes one or more volatile or non-volatile storage devices for storing files generated by a user or obtained from another source.

A server used in some embodiments may include a trained model and a knowledge base. The knowledge base may include, for example, information describing the code base of a particular organization, business unit, or other entity. As further described herein, a trained model may be applied to a corpus of tokens, such as words, and outputs data (ultimately generating computer program code or recommended computer program code). Additionally, a trained model may receive input comprising tokens, such as multiple words, and outputs one or more suggested tokens that are based on the input token. When generating one or more suggested tokens, the trained model can account for both the input tokens and information contained in the knowledge base, allowing the trained model to account for a greater amount of information, both from the knowledge base and from the input tokens, to generate the suggested tokens.

In various embodiments, the server includes one or more graphics processing units ('GPUs') that execute instructions comprising one or more trained models. In other embodiments, the server includes one or more processors that execute instructions comprising one or more trained models. Further, in various embodiments, the server includes an application programming interface ('API') layer that exchanges data with one or more client devices. For example, the API layer may receive one or more input tokens from a client device and routes the one or more input tokens to one or more trained models; one or more output tokens from a trained model are obtained by the API layer, which transmits the one or more output tokens to the client device. Further, the API layer may receive files that are provided to a trained model, which may generate information describing an organization's code base that are stored in the knowledge base.

Reader will appreciate that while many of the embodiments described above relate to embodiments where information describing a domain-specific codebase is used to generate suggested code or code completion recommendations, in other embodiments, other types of natural language-based content may be generated. For example, the model(s) described here (or other/additional models) may be used to generate explanations, documentation, dialog, code review comments, or some other type of natural language-based content that can be improved by using knowledge of the domain-specific codebase. In such a way, the natural language-based content may be tailored to include information associated with the domain-specific codebase, the natural language-based content may be associated with particular code from the domain-specific codebase, or the natural language-based content may otherwise be generated in a way that has awareness of the domain-specific codebase.

To leverage a corpus of tokens (e.g., words) available to the trained model, the trained model may access tokens or other information from the knowledge base, which may be embodied as words, phrases, or other data in various embodiments. In some embodiments, the content in the knowledge base is obtained from enterprise-specific files or data (e.g., such as the contents of an enterprise-specific code base), allowing the knowledge base to reflect enterprise-specific usage of tokens, combinations of tokens, and so on. In some embodiments, the source of the tokens includes text data from which tokens (e.g., words) are obtained, while in other embodiments a trained model is trained using images to which the trained model is applied. The knowledge base may allow the trained model to subsequently make use of the enterprise-specific examples of code to generate an output when an input is received. In some embodiments, other information may be included in the knowledge base or used to generate content in the knowledge base. For example, other files related to the files of code, such as documentation, may be included in the knowledge base (or used to generate content contained in the knowledge base or to generate output by a trained model) in various embodiments. Furthermore, files relating to a particular field, such as legal documents, a question-and-answer knowledge base, mathematical reasoning, or information may be retained in the knowledge base or used to generate content in the knowledge base.

In various embodiments, all content in the knowledge base or used to generate content in the knowledge base is associated with a particular enterprise, providing an enterprise-specific corpus for training one or more trained models and for generating output from the one or more trained models. Having an enterprise-specific information allows the trained models and the knowledge base to reflect token usage and syntax tailored to the particular enterprise. This allows the trained models to account for enterprise-specific characteristics or preferences when generating output tokens from input tokens.

In some embodiments such as in a development environment, the knowledge base includes source code files (or content generated from such source code files) that include code for execution by one or more processors. In some embodiments, the knowledge base includes documentation describing one or more of the source code files (or content generated at least in part based on such documentation), files describing issues tracked with one or more source code files (or content generated at least in part based on files describing issues tracked with one or more source code files), files describing revision histories to one or more source code files (or content generated at least in part based on files describing revision histories to one or more source code files), or other information. Inclusion of such content in the knowledge base allows the trained models to account for more contextual information to supplement received input tokens. This allows the output tokens from the trained models to better account for the environment in which the trained models are executed by increasing an amount of information about the environment that is described by the content of the knowledge base.

Readers will appreciate that generative AI systems described here may make use of neural networks (e.g., Recurrent Neural Networks ('RNNs'), Generative Adversarial Networks ('GANs'), and so on). Generative AI systems may leverage models that have been trained on large datasets of existing content to understand patterns, styles, and structures. For instance, a text-based generative AI model may be trained on a corpus of books, articles, or other written/digital content to generate coherent and contextually relevant text. Likewise, a generative AI model that is designed to generate computer program code may be trained on public code bases, private code bases, or combinations thereof.

In embodiments where generative AI (in the form of one or more models, one or more services, one or more software modules, or any combination thereof) is used to generate computer program code, models may be trained on a knowledge base that can include, for example, an organization's existing code base. In some embodiments, however, when the generative AI is being tasked with generating code, the model may not be able to access the entire knowledge base due to the size of the knowledge base and limitations around how much information can be passed to the model at inference time. For example, while the model may leverage the entire code base at training time, the amount of additional information that can be passed to the model at inference time may be limited, which can present issues especially where the knowledge base is dynamic (e.g., like the dynamic code base of an organization).

Readers will appreciate that in some embodiments where generative AI systems are used to generate computer program code, models may be trained on a code base (including the code base of a particular business, a particular business unit, a particular developer or group of developers, and so on). While such a code base may change, such change may occur over a non-trivial amount of time such that while the code base is not static, the code base does change slowly. For example, a particular business organization is unlikely to rewrite their entire code bases daily. As such, in some embodiments, caching and offline processing of a particular code base may be leveraged. In these embodiments, various computations may be performed offline.

Consider an example in which a user of the generative AI systems is writing some code segment (e.g., a function) and the generative AI system is tasked with recommending some code snippet that can be inserted into the code that is being developed (i.e., the generative AI system is task with performing an auto-completion function for some code that is being written). In this example, computations that are related to identifying characteristics of code that is contained in the code base may be done offline and the results of those computations may be cached (at least partially), so that the results of those computations can be leveraged when suggesting code to insert—without needing to inspect the entire code base constantly as the user develops code.

In a similar manner, other computations (e.g., those that are associated with detecting the intent of a user that is developing code, those computations that are otherwise associated with analyzing a code base) may be performed offline and cached. In this example, the term 'offline' can include at times other than when the generative AI system is attempting to generate output. For example, the computations could occur at some time other than when the generative AI system is evaluating code that is being developed by a user and recommending code that could be inserted into the user's code.

Through the usage of offline processing and caching, the systems described here can pre-compute things, partially cache them, and even perform relatively cheap updates on the fly to have very powerful models that are fast and current. For example, any kind of latent representation that reflect an understanding of the code base can be precomputed and cached to understand what different pieces of the code base can do, to generate summaries of the code base, analysis of the code base, chains of thought related to the code base, and so on. Reader will appreciate that because neural networks transform discrete input (e.g., tokens) into embeddings, the cache could be structured so that what we cache is an intermediate latent representation (i.e., some simplified version of input) rather than something that would be sent to a user of the system such as a software developer, where that intermediate latent representation could be used for a variety of purposes later on.

In some embodiments, generative AI systems may be enhanced through retrieval augmentation that allows for efficient retrieval and filtering of relevant pieces of code that may ultimately be presented to a user for inclusion in some code that the user is developing, or otherwise included in some code that is being generated. In some embodiments, separate models may be trained to do the retrieval. These models may be used, for example, to look at a piece of code (i.e., code that is being written by a developer), compare it to some other code/search the knowledge base for the most relevant piece of code, and then present that relevant piece of code to the developer. To train these retrieval models, the models may need to be provided with many examples of code that is related so as to enable the model to identify related code. To generate a signal that relates two pieces of code, some embodiments may examine existing code repositories and look at each change that is made in the code repository and identify situations in which changing a first piece of code was followed by a second piece of code being changed, as this may be indicative of the first piece of code and the second piece of code being related. This may be especially true in some situations such as, for example, when the same user changed each piece of code in a relatively short period of time. In these embodiments, commit histories from a code management system may be examined to identify the activity described above, or other data sources may be examined to identify activity that may be taken as a signal that some pieces of code are related. In other embodiments, other information may be indicative that some pieces of code are related. For example, if two pieces of code are described in the same document (e.g., a design document), this may be an indication that the two pieces of code are related. Readers will appreciate that such signals (and other signals) may be fairly specific to code rather than language generally, so these signals may be more useful when training retrieval models that are part of a generative AI system that generates computer program code.

Readers will appreciate that in some forms of generative AI (e.g., autoregressive language models), a user may be editing a document with their cursor in a particular location. In these embodiments, the generative AI application may know what came before the cursor and may be attempting to determine what comes next. With code, however, the user of generative AI system that generates code may be editing some code segment with their cursor in a particular location of the code that they are developing. The generative AI system that generates code may benefit from knowing not only what came before the cursor, but the generative AI system may also benefit from understanding what comes at some point after the cursor—as the generative AI is attempting to determine what comes in the middle of those two code portions. As such, embodiments of the present disclosure may be configured to analyze code, come up with examples of code that is aligned with what a user would want to do, and training models on that dataset. Such a process may, in some embodiments, involve statically analyzing existing code (i.e., code from a user's code base) to pick out some fill-in-the-middle ('FIM') examples. For example, the models may be trained with examples of what is typically written between a set of parentheses, examples of what is typically written inside a loop, examples of what is typically written to complete a function, and so on.

In some embodiments, the generative AI systems described here may leverage a set of static code analysis heuristics that work well and can be used to create a dataset that is useful for training models uses by generative AI systems that can do FIM for computer program code. In these embodiments, models are trained and training sets are generated to cover sampling at multiple levels of hierarchy (parenthesis, functions, class, etc. . . . ). The training sets are also created with a distribution that is similar to a distribution that would be similar to a user's knowledge base (i.e., their code repository) so that models behave in accordance with the appropriate distribution.

Readers will appreciate that the fact that code is structured may be particularly useful in FIM applications. In particular, because code has a lot of structure, the systems described herein may be leverage that structure to identify semantically meaningful expressions, figure out where they begin and end, and accuracy of the models may be improved by leveraging the knowledge of such structure.

In some embodiments, transformer models that are used by the disclosed generative AI systems may use Multilayer Perceptron ('MLP'), Transformers with cross attention, or other components. These components can frequently use large amounts of computing resources. At inference time, one vector that represents a token that is being processed is passed through a leaf matrix and a tensor is output, which is subsequently passed through another matrix. Embodiments described herein may sort the entrance of this matrix so that similar rows are close to each other and placed into buckets. Readers will appreciate that after an activation function, all negative values are zeroed out and there are frequently only very few positive values (1-5%). In some embodiments, the relatively small number of buckets that produce positive values can be identified and only those buckets may be used in subsequent computations. Furthermore, estimations may be made regarding which buckets will produce positive values, thereby drastically reducing the amount of the amount of compute necessary. An example is depicted in the figures.

In some embodiments, retrieval can be enhanced using static analysis of code as described above. Readers will appreciate that some embodiments go beyond this straightforward usage of static analysis. For example, in some embodiments static analysis will be combined with fine tuning of code models. Readers will appreciate that retrieval can be leveraged to show things to a model, but if the model wasn't specifically trained to use that kind of information, results may be less than ideal. To improve results, in some embodiments models that are part of the generative AI systems described here may be trained on the type of information that retrieval models can retrieve (e.g., while some embodiments can do static analysis and pull up some functions definitions, other embodiments may involve the additional step of training the model to use those function definitions). In addition, a dense retriever may be trained to imitate that behavior (i.e., using static analysis to retrieve), but it is just one signal that is leveraged by the model. This embodiment may be more flexible than doing static analysis-based retrieval because a neural retrieval model has the ability to weigh how important it is to generate some function based on static analysis, but the neural model also can use other considerations as signals. The model may therefore combine different signals into a single model (e.g., static analysis+detecting whether two pieces of code are related based on them being described in the same model+ other signals). Essentially the static analysis is just one signal, but the model takes other signals into consideration as well. In embodiments where a dense retriever is trained as described here, at inference time it may not be necessary to do the static analysis in real-time.

Readers will appreciate that one aspect related to generating code that is distinct from generating natural language text is that code can be executed. In fact, in some embodiments code may be executed to provide valuable signals to one or more models that are used by a generative AI system. For example, if the code that was generated by a generative AI system doesn't compile, this is a powerful signal that one or more models that are used by a generative AI system didn't generate valuable out. Such signals may not be present in other generative AI domains (e.g., general text generation).

In some embodiments, code compilation and/or code execution may be used as signals for various models that are used by the generative AI system, including code generation models, retrieval models, and so on. In fact, code compilation and/or code execution may be used in the training of various models, or as input signals when the trained models are being utilized. Code compilation and/or code execution can be used, for example, to identify relationships between code segments (e.g., a code segment can be executed to see what other functions are called as a result of running that code segment). This is one example of a signal that could be generated by code execution. Other examples can include providing a stack trace in model training or as input to a trained model during model execution, providing error messages in model training or execution, and so on. In some embodiments, the execution of code could be periodically stopped to not only check its state but to use that state for model training and execution.

Readers will appreciate that running code models/language models can be a slow process as tokens are generated one at a time. For example, models may receive a question, crunch through it and predict the next word, then the next word, then the next word, and so on, such that this process becomes highly serialized. Embodiments described here may leverage speculative decoding that takes advantage of the fact that many words are easy to predict (e.g., the). In order to leverage speculative decoding, a small, simple model may be used to generate some potential outputs (e.g., in response to a cursor being at some location within a code segment) and then larger, more highly tuned models may be leveraged to sift through the speculatively generated output—keeping the good ones and tossing the bad ones.

In some embodiments, speculative decoding may leverage any small type of 'small' model in the sense that executing the model is not as resource intensive as executing larger, more complicated models. In some embodiments, the small model is a scaled down version of a larger model, but in other embodiments the small model is not a small version of the larger model. For example, the small model may be embodied as a classical model from machine learning (i.e., a model that is not a neural network) that is trained on the requests of a user of the generative AI system. Such a request may include some number (i.e., a few thousand) of tokens: here is what the current file of the user looks like, here is where the cursor is located and where we want to generate code, and so on. In some embodiments, those tokens may be passed to some small model (e.g., an n-gram model or some other non-neural model) to speculatively generate output, where the small model is trained on the requests such as those described above or similar requests.

Readers will appreciate that as described above (and in other ways), some aspects associated with executing a generative AI system may involve serial processing and execution of various components. Readers will appreciate that while parallel processing is more efficient than serial processing, it is not infinitely more efficient. More specifically and as applied to speculative decoding, while there is a limit to how many speculative guesses (i.e., speculative outputs) that can be sent to the GPUs and downstream components to sift through while still being efficient, that limit is reasonably high for modern computing components such as GPUs. In some embodiments, it may therefore be possible to send batches of guesses (i.e., speculative outputs) in parallel (e.g., guess on the 10 next tokens using model 1 and send that as batch 1, guess on the 10 next tokens using model 2 and send that as batch 2, and so on).

In some embodiments, to reap meaningful benefits from speculative decoding, multiple small models may be used for performing speculative decoding in parallel. More specifically, different types of small models may be used for speculative decoding in parallel, as there is value in making diverse guesses (i.e., speculative outputs) rather than making the same guesses multiple times. For example, because an n-gram model trained as described above may generate dramatically different guesses than an n-gram model trained differently, which may generate dramatically different guesses than a small neural model, the embodiments described herein may leverage multiple types of small models doing speculative decoding in parallel. The observation here may be that while each of these small models has some defects, they have different defects.

In some embodiments, the generative AI systems may leverage a user interface that can itself present useful features of the generative AI system or otherwise provide access to useful features of the generative AI system. For example, in some embodiments a UI may be provided to enable a user of the generative AI system to effectively provide pseudocode that relates to some code that the user would like to have the generative AI system create. In this embodiment, a user of the generative AI system can provide a description of what they want the code to generally do. The user may subsequently be presented with a list of options and the user can make a selection (at which point the model is told to turn the selection into real code). Furthermore, in some embodiments other features could be delivered through the UI. For example, the UI may present information to a user of the generative AI system to show the user what sources from their code base were used to do some code completion/code creation that was output by the generative AI system. In some embodiments, the user could even provide feedback (e.g., indicate whether the source is good source or not) that one or more models in the generative AI system can be trained on.

In some embodiments, an auditing function could be delivered through the UI, where a user of the generative AI system could be presented with information identifying what portions of some code was written by a developer (or edited by a developer) and what part was generated by the generative AI system. In some embodiments, information could even be delivered through the generative AI system indicating which user within their organization wrote some code, what the code generation tool wrote, and discovered issues or other metrics could even be tied back to those specific code portions. For example, tools could be used to tie the introduction of some code update to performance degradation that was discovered, to the introduction of a security vulnerability that was discovered, to a spike in memory utilization that was discovered, and so on. Not only would it be useful to alert a user to this sort of information via the UI, but this information could even be used as a signal that is mapped back to a particular change for training, remediation, and so on.

Readers will appreciate that in some situations users of a generative AI system that generates computer program code may experience problems when autosuggesting or completing code. For example, users may be working on incomplete state of their code where a large amount of code (e.g., a function or class) may need to be completed, but they would prefer to review and accept completions in small amounts (e.g., a single function call, statement, or for loop). In addition, users may have some structure (e.g., closing brackets, quotes) that is auto-inserted by their IDE, which need to be skipped by code generation models during code generation. In some embodiments, pause and skip tokens may be utilized to address the situations described above.

To address the situation where a user would prefer to review and accept completions in small amounts, the code generation models that are included in the generative AI systems described here may be trained to generate a special "pause" token that helps the IDE to show the user a smaller completion. In these embodiments, if the user approves this completion, it can immediately show the next part of the completion and so on. This may be achieved, for example and in some embodiments, by modifying the training algorithms that are used to insert pause tokens at the boundaries between syntactic units (i.e., with the help of a parse tree). The code generation models may then be taught to still generate everything that's missing after the cursor, but doing so in multiple pauses so that we can stop the generation after any pause token and present the user with more manageably-sized suggestions that are syntactically correct.

To address the situation where users may have some structure (e.g., closing brackets, quotes) that is auto-inserted by their IDE and needs to be skipped by code generation models during code generation, the code generation models that are included in the generative AI system may be trained to generate a special "skip" token that indicates to the IDE that a completion can skip over some of the text after the cursor. In some embodiments, such auto-closing behaviors may be simulated during training data generation (again, making use of a parse tree) and the code generation models may be taught to output a skip token whenever it needs to "jump over" the next closing bracket or other skippable characters.

Although some embodiments are described largely in the context of a generative AI system, a server with generative AI capabilities, or in some other way, readers of skill in the art will recognize that embodiments of the present disclosure may also take the form of a computer program product disposed upon computer readable storage media for use with any suitable processing system. Such computer readable storage media may be any storage medium for machine-readable information, including magnetic media, optical media, solid-state media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps described herein as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

Readers will appreciate that some embodiments are described in which computer program instructions are executed on computer hardware such as, for example, one or more computer processors. Readers will appreciate that in other embodiments, computer program instructions may be executed on virtualized computer hardware (e.g., one or more virtual machines), in one or more containers, in one or more cloud computing instances (e.g., one or more AWS EC2 instances), in one or more serverless compute instances offered such as those offered by a cloud services provider, in one or more event-driven compute services such as those offered by a cloud services provider, or in some other execution environment.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g., a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

What is claimed is:

1. A method comprising:

receiving, from a process configured to monitor test execution in a Continuous Integration/Continuous Delivery (CI/CD) pipeline of a computer program, an indication to identify a root cause of a failed test of the computer program and data describing the failed test;

accessing, in response to the indication and from a code repository, code of the computer program in a passing state that previously passed the failed test;

generating a differential between the code of the computer program in the passing state and code of the computer program that caused the failed test;

identifying, by a root cause model, from a plurality of changes to the computer program included in the differential, based on the data describing the failed test, one or more changes to the computer program as the root cause of the failed test, wherein the root cause model comprises a specifically trained root cause model trained using a training data set comprising a plurality of tuples each including data describing a code change that introduced a corresponding test failure, data describing the corresponding test failure, and data describing another code change that corrected the corresponding test failure; and receiving, by a trained code generation model, one or more input tokens encoding the root cause of the failed test; and sequentially generating, by the trained code generation model and based on the one or more input tokens, one or more output tokens encoding suggested code to insert into the computer program to correct the failed test, wherein the one or more output tokens are sequentially generated based on a prediction of a next token in a sequence of the one or more output tokens.

2. The method of claim 1, wherein identifying, from the plurality of changes to the computer program, the one or more changes to the computer program as the root cause of the failed test comprises evaluating, by the root cause model, for each change of the plurality of changes, whether a corresponding change is included in the root cause of the failed test.

3. The method of claim 1, further comprising:

selecting, by a retrieval model, data associated with a code base of the computer program; and wherein the one or more changes to the computer program as the root cause of the failed test are further identified based on the data associated with the code base of the computer program.

4. The method of claim 1, further comprising:

presenting, to a user, an indication of the root cause in the plurality of changes; and receiving, from the user, an update to the root cause.

5. The method of claim 1, further comprising training the root cause model using the training data set.

6. The method of claim 1, wherein the data describing the failed test comprises data describing an execution path of the computer program when executing the failed test.

7. The method of claim 1, further comprising updating the root cause model based on the update to the root cause received from the user.

8. The method of claim 1, further comprising:

identifying, using a location model, based on the data describing the failed test and the root cause, a location to insert the suggested code; and wherein the suggested code is generated by the trained code generation model based on the location to insert the suggested code; and wherein the location model comprises a specifically trained location model trained using another training data set comprising a plurality of failed tests and a plurality of code edits to correct a corresponding failed test of the plurality of failed tests.

9. A system comprising:

a memory; and a processing device, operatively coupled to the memory, the processing device configured to:

receive, from a process configured to monitor test execution in a Continuous Integration/Continuous Delivery (CI/CD) pipeline of a computer program, an indication to identify a root cause of a failed test of the computer program;

access, in response to the indication and from a code repository, code of the computer program in a passing state that previously passed the failed test;

generate a differential between the code of the computer program in the passing state and code of the computer program that caused the failed test;

identify, by a root cause model, from a plurality of changes to the computer program included in the differential, based on data describing the failed test, one or more changes to the computer program as the root cause of the failed test, wherein the root cause model comprises a specifically trained root cause model trained using a training data set comprising a plurality of tuples each including data describing a code change that introduced a corresponding test failure, data describing the corresponding test failure, and data describing another code change that corrected the corresponding test failure; and receive, by a trained code generation model, one or more input tokens encoding the root cause of the failed test; and sequentially generate, by the trained code generation model and based on the one or more input tokens, one or more output tokens encoding suggested code to insert into the computer program to correct the failed test, wherein the one or more output tokens are sequentially generated based on a prediction of a next token in a sequence of the one or more output tokens.

10. The system of claim 9, wherein, to identify, from the plurality of changes to the computer program, the one or more changes to the computer program as the root cause of the failed test, the processing device is further configured to evaluate, by the root cause model, for each change of the plurality of changes, whether a corresponding change is included in the root cause of the failed test.

11. The system of claim 9, wherein the processing device is further configured to:

select, by a retrieval model, data associated with a code base of the computer program; and wherein the one or more changes to the computer program as the root cause of the failed test are further identified based on the data associated with the code base of the computer program.

12. The system of claim 9, wherein the processing device is further configured to:

present, to a user, an indication of the root cause in the plurality of changes; and receive, from the user, an update to the root cause.

13. The system of claim 9, wherein the processing device is further configured to train the root cause model using the training data set.

14. The system of claim 9, wherein the data describing the failed test comprises data describing an execution path of the computer program when executing the failed test.

15. The system of claim 9, wherein the processing device is further configured to update the root cause model based on the update to the root cause received from the user.

16. The system of claim 9, wherein the processing device is further configured to:

identify, using a location model, based on the data describing the failed test and the root cause, a location to insert the suggested code; and wherein the suggested code is generated by the trained code generation model based on the location to insert the suggested code; and wherein the location model comprises a specifically trained location model trained using another training data set comprising a plurality of failed tests and a plurality of code edits to correct a corresponding failed test of the plurality of failed tests.

17. A non-transitory computer readable storage medium storing instructions which, when executed, cause a processing device to:

receive, from a process configured to monitor test execution in a Continuous Integration/Continuous Delivery (CI/CD) pipeline of a computer program, an indication to identify a root cause of a failed test of the computer program and data describing the failed test;

access, in response to the indication and from a code repository, code of the computer program in a passing state that previously passed the failed test;

generate a differential between the code of the computer program in the passing state and code of the computer program that caused the failed test;

identify, by a root cause model, from a plurality of changes to the computer program included in the differential, based on the data describing the failed test, one or more changes to the computer program as the root cause of the failed test, wherein the root cause model comprises a specifically trained root cause model trained using a training data set comprising a plurality of tuples each including data describing a code change that introduced a corresponding test failure, data describing the corresponding test failure, and data describing another code change that corrected the corresponding test failure; and receive, by a trained code generation model, one or more input tokens encoding the root cause of the failed test; and sequentially generate, by the trained code generation model and based on the one or more input tokens, one or more output tokens encoding suggested code to insert into the computer program to correct the failed test, wherein the one or more output tokens are sequentially generated based on a prediction of a next token in a sequence of the one or more output tokens.

18. The non-transitory computer readable storage medium of claim 17, wherein, to identify, from the plurality of changes to the computer program, the one or more changes to the computer program as the root cause of the failed test, the instructions, when executed, further cause the processing device to evaluate, by the root cause model, for each change of the plurality of changes, whether a corresponding change is included in the root cause of the failed test.

19. The non-transitory computer readable storage medium of claim 17, wherein the instructions, when executed, further cause the processing device to:

present, to a user, an indication of the root cause in the plurality of changes; and receive, from the user, an update to the root cause.

20. The non-transitory computer readable storage medium of claim 17, wherein the data describing the failed test comprises data describing an execution path of the computer program when executing the failed test.

* * * * *